(12) United States Patent
Fyfe et al.

(10) Patent No.: US 8,795,832 B2
(45) Date of Patent: Aug. 5, 2014

(54) SYSTEMS AND METHODS FOR PROTECTING A CABLE OR CABLE BUNDLE

(75) Inventors: Edward Fyfe, Del Mar, CA (US); Zachery Smith, San Diego, CA (US)

(73) Assignee: Fyfe Co., LLC, San Diego, CA (US)

( * ) Notice: Subject to any disclaimer, the term of this patent is extended or adjusted under 35 U.S.C. 154(b) by 252 days.

(21) Appl. No.: 13/195,789

(22) Filed: Aug. 1, 2011

(65) Prior Publication Data

US 2012/0058338 A1 Mar. 8, 2012

Related U.S. Application Data

(60) Provisional application No. 61/369,575, filed on Jul. 30, 2010.

(51) Int. Cl.
*D07B 1/00* (2006.01)
*D07B 5/00* (2006.01)

(52) U.S. Cl.
CPC .. *D07B 1/00* (2013.01); *D07B 5/00* (2013.01); *D07B 2201/2083* (2013.01); *D07B 2201/2087* (2013.01); *D07B 2201/2088* (2013.01); *D07B 2201/2091* (2013.01); *D07B 2401/202* (2013.01); *D07B 2501/2015* (2013.01); *D07B 2801/22* (2013.01)
USPC .......................................... 428/379; 427/230

(58) Field of Classification Search
USPC ....................................................... 427/407.1
See application file for complete search history.

(56) References Cited

U.S. PATENT DOCUMENTS

| | | | | |
|---|---|---|---|---|
| 2,001,319 A | * | 5/1935 | Stanley | 174/128.1 |
| 3,979,896 A | * | 9/1976 | Klett et al. | 57/217 |
| 4,847,976 A | * | 7/1989 | Winkler et al. | 29/433 |
| 5,813,106 A | * | 9/1998 | Haug et al. | 29/429 |
| 5,993,924 A | * | 11/1999 | Deroch et al. | 428/36.91 |
| 6,291,024 B1 | * | 9/2001 | Deroch et al. | 427/409 |
| 6,692,829 B2 | * | 2/2004 | Stubler et al. | 428/379 |
| 7,828,121 B2 | * | 11/2010 | Parrini | 187/251 |
| 2008/0093107 A1 | * | 4/2008 | Amigouet et al. | 174/121 A |

FOREIGN PATENT DOCUMENTS

| | | | |
|---|---|---|---|
| CA | 2364595 A1 * | 6/2002 | |
| DE | 1 938 931 A1 * | 2/1971 | |
| EP | 1 235 232 A * | 8/2002 | |
| GB | 1151596 A * | 5/1969 | |
| WO | WO 00/37738 A1 * | 6/2000 | |
| WO | WO 2011/076273 A1 * | 6/2011 | |

* cited by examiner

*Primary Examiner* — William Philip Fletcher, III
(74) *Attorney, Agent, or Firm* — Senniger Powers LLP

(57) ABSTRACT

According to some embodiments, a cable protection system to at least partially shield a cable from heat, fire, an impact or other potentially harmful event or occurrence comprises a first encompassing member configured for placement around the cable or cable bundle, wherein a first void is defined between the first encompassing member and an outside of the cable or cable bundle. The system additionally includes a second encompassing member positioned around the first encompassing member, wherein a second void is defined between the first encompassing member and the second encompassing member. Further, the system comprises one or more fill materials positioned within the second void. In some embodiments, the fill material comprises vermiculite, ceramic and/or one or more other materials. The first void permits the cable protection system to be slidably moved relative to the cable or cable bundle.

24 Claims, 11 Drawing Sheets

SYSTEMS AND METHODS FOR PROTECTING A CABLE OR CABLE BUNDLE

CROSS REFERENCE TO RELATED APPLICATIONS

This application claims the priority benefit under 35 U.S.C. §119(e) of U.S. Provisional Patent Application No. 61/369,575, filed Jul. 30, 2010, the entirety of which is hereby incorporated by reference herein.

In addition, the entireties of U.S. patent application Ser. No. 12/709,388, filed Feb. 19, 2010, and Ser. No. 12/715,101, filed Mar. 1, 2010, are hereby incorporated by reference herein and made a part of the present specification.

BACKGROUND

1. Field

This application relates generally to devices, systems and methods for protecting cables and other structural members against fire, heat, impact, explosions or other blast events, and other potentially damaging events and occurrences.

2. Description of the Related Art

Various methods of reinforcing cables (e.g., tension cables used in bridges and other structures), columns and other structural components against blast events (e.g., explosions, other short or long-range blasts, etc.), fire or heat damage (e.g., by blowtorches, flamethrowers, other fire or heat sources, etc.), impact forces (e.g., from ramming devices, gunfire, other weapons or projectiles, etc.) or other occurrences responsible for generating potentially damaging forces and moments are known. Threatening occurrences may occur intentionally or non-intentionally through one or more manmade or natural activities, such as, for example, terrorist acts, accidents, weather-related events and/or the like. Thus, there remains a need for a more reliable, efficient and cost-effective method of reinforcing cables (e.g., for bridges or other structures) and/or other components of a structure.

SUMMARY

According to some embodiments, a method of protecting a structural cable, another structural or non-structural member or bundle thereof against a potentially harmful event or occurrence (e.g., explosive or blast event, fire, high heat condition, terrorist-related event, ramming, cutting or other impact related occurrence, torching, etc.) comprises positioning a first encompassing member or shell around the cable, cable bundle or other item to be protected, wherein a first space is defined between said first encompassing member and said cable or cable bundle. The method further includes positioning a first fill material within the first space to at least partially fill the first space. In some embodiments, the first fill material comprises vermiculite and/or ceramic. In other embodiments, the fill material is configured to comprise a fire suppressant or fire retardant material. In one embodiment, the fill material does not comprise concrete and/or cement.

According to some embodiments, the fill material additionally comprises one or more of the following materials: a resin, a rubber, a polymeric material, reinforcing fibers, an epoxy, a grout, a cement, a granite, a wood or paper-based material and a felt. In some embodiments, the method further comprises placing at least one tile (e.g., a plurality of ceramic tiles) within the first space. In some embodiments, the at least one tile provides protection against fires, heat, sawing, other types of cutting or potentially comprising activities, abrasion and/or the like. In some embodiments, the method further comprises securing a plurality of tiles on, along or near the first encompassing member. In one embodiment, the plurality of tiles comprises ceramic tiles. In some embodiments, the first fill material is sprayed or other provided into the first space using a pressurized system. In other embodiments, the fill material is gravity fed into the first space. In some embodiments, the first space comprises at least one compressible or dampening member or material (e.g., springs, polyurethane materials, viscoelastic materials and/or the like).

According to some embodiments, the method further comprises positioning a second encompassing member or shell around the cable or cable bundle, wherein the second encompassing member is positioned within the first space and generally between the first encompassing member and the cable or cable bundle. In one embodiment, a second space is defined between the second encompassing member and the first encompassing member, such that a third space is defined between the second encompassing member and the cable or cable bundle. In some embodiments, the first and second encompassing members are removably or permanently attached to each other, and wherein the first and second encompassing members comprise a cable protection system. In some embodiments, the protection system is movable relative to the cable or cable bundle (e.g., for inspection, repair, replacement and/or any other purpose). In one embodiment, the third space comprises an air gap configured to permit the first and second encompassing members and the fill material to be slidably moved relative to the cable or cable bundle. In some embodiments, the second space comprises one or more fill materials, tiles, compressible or dampening members and/or any other material, substance or item. In some embodiments, one or more tiles are positioned along a surface of the first encompassing member and/or the second encompassing member.

According to some embodiments, the method further comprises placing or otherwise positioning one or more exterior portions along an outside surface of the first encompassing member. Such exterior portions can be sacrificial in nature and can be configured to further enhance the performance of the cable protection system. In some embodiments, the exterior portion is configured to dissipate or deflect forces directed toward the protection system. In some embodiments, the at least one exterior portion comprises one or more layers of rubber (e.g., neoprene, natural rubber, etc.), other elastomeric or polymeric materials, other deformable materials and/or other force deflecting members or components. According to some embodiments, the exterior portion comprises at least one layer of a fiber reinforced resin (e.g., CFRP, AFRP, GFRP, etc.). In one embodiment, such fiber reinforced resins or polymers comprise one or more layers that are configured to surround and hold in place layers of rubber and/or other force-dissipating and/or force-deflecting members. In one embodiment, the first encompassing member or shell comprises a metal. In some embodiments, the first encompassing member or shell comprises a high strength steel alloy. In some embodiments, the first encompassing member or shell comprises a polymer. In one embodiment, the first encompassing member or shell is prefabricated. In other embodiments, the first encompassing member comprises a unitary structure. In other embodiments, the first encompassing member comprises two or more separate portions configured to be permanently or removably secured to one another.

According to some embodiments, a protection system to at least partially shield a cable from a potentially harmful event, act or occurrence, the system comprises a first shell configured for placement around a cable or cable bundle, wherein a first void is defined between said first shell and an outside of the cable or cable bundle. In one embodiment, the system further comprises a second shell positioned around the first shell, wherein a second void is defined between the first shell and the second shell. In some embodiments, the system additionally comprises at least one fill material positioned within the second void. In some embodiments, the fill material comprises vermiculite, ceramic, cement and/or any other materials. In one embodiment, the first void permits the cable protection system to be slidably moved relative to the cable or cable bundle.

According to some embodiments, the fill material further comprises one or more of the following materials: resin, rubber, reinforcing fibers, epoxies, grouts, cement, steel, alloys or other metals, granite, wood or paper-based materials and felt. In one embodiment, the second void comprises at least one tile (e.g., a plurality of ceramic tiles). In other embodiments, the tiles are positioned along an exterior wall of the inner shell and/or an interior wall of the outer shell. In one embodiment, the second void comprises at least one compressible or dampening material or device. In some embodiments, the system further comprises at least one exterior portion along an outer portion of the outer shell. In some embodiments, the exterior portion comprises at least one layer of fiber reinforced polymer, at least one layer of rubber and/or other resilient material configured to at least partially deflect a force directed at the system and/or any other material or component.

According to some embodiments, the outer shell and/or the inner shell comprises a metal. In one embodiment, the outer shell and/or the inner shell comprises a high strength steel alloy. In some embodiments, the outer shell and/or the inner shell comprises a polymer. In one embodiment, the outer shell and/or the inner shell is prefabricated. In some embodiments, the outer shell and/or the inner shell comprises a unitary structure. In other embodiments, the outer shell and/or the inner shell comprise two or more separate portions configured to be permanently or removably secured to one another. In one embodiment, the system further comprises at least one lifting member configured to assist in slidably moving the protection system relative to the cable or cable bundle.

According to some embodiments, a protection system adapted to at least partially shield a cable from a potentially harmful event, act or occurrence comprises a first encompassing member or shell configured for placement around a cable or cable bundle and at least one fill material at least partially positioned between the first encompassing member and the cable or cable bundle. In one embodiment, the fill material comprises at least one of vermiculite and ceramic. In some embodiments, a plurality of ceramic tiles are positioned adjacent the at least one fill material. In some embodiments, the system additionally includes a second encompassing member or shell positioned between the first encompassing member and the cable or cable bundle. In one embodiment, the fill material is positioned within a void defined between the first and second encompassing members. In some embodiments, ceramic tiles are positioned on or along at least one wall of the first or second encompassing member. In some embodiments, the system additionally comprises one or more exterior portions positioned along an outer portion of the first encompassing member or shell. In one embodiment, the exterior portion comprises at least one layer of fiber reinforced polymer. In some embodiments, the exterior portion comprises at least one layer of rubber and/or other resilient material or member configured to at least partially deflect a force directed at the system. In some embodiments, the first encompassing member and/or the second encompassing member comprises a metal.

According to some embodiments, a cable protection system to at least partially shield a cable from heat, fire, an impact or other potentially harmful event or occurrence comprises a first encompassing member configured for placement around the cable or cable bundle, wherein a first void is defined between the first encompassing member and an outside of the cable or cable bundle. The system additionally includes a second encompassing member positioned around the first encompassing member, wherein a second void is defined between the first encompassing member and the second encompassing member. Further, the system comprises one or more fill materials positioned within the second void. In some embodiments, the fill material comprises vermiculite, ceramic and/or one or more other materials. The first void permits the cable protection system to be slidably moved relative to the cable or cable bundle.

According to some embodiments, the fill material comprises a resin, rubber or other elastomeric materials, other polymers, reinforcing fibers, epoxies, grouts, cement, steel, alloys or other metals, granite, wood or paper-based materials, felt and/or the like. In one embodiment, the second void comprises one or more ceramic tiles. In some arrangements, the ceramic tiles are positioned along an exterior wall of the inner encompassing member and/or an interior wall of the outer encompassing member.

In some embodiments, the second void comprises one or more compressible or dampening materials or devices, such as, for example, springs, polyurethane materials, viscoelastic materials and/or the like. In one embodiment, the protection system includes one or more outer layers or coatings along an exterior of the outer encompassing member. In some embodiments, the outer layer or coating comprises fiber reinforced polymer.

According to some embodiments, the outer encompassing member and/or the inner encompassing member comprise steel or some other metal or alloy (e.g., high strength steel alloy). In other embodiments, the outer encompassing member and/or the inner encompassing member comprise a polymer. In one embodiment, the outer encompassing member and/or the inner encompassing member are prefabricated. In other embodiments, the outer encompassing member and/or the inner encompassing member comprise a unitary structure. In an alternative embodiment, the outer encompassing member and/or the inner encompassing member comprise two or more separate portions that are configured to be permanently or removably secure to one another. In some embodiments, the system additionally includes one or more lifting members (e.g., bolt holes, eye holes, etc.) configured to assist in slidably moving the cable protection system relative to the cable or cable bundle.

According to some embodiments, a method of protecting a structural cable or cable bundle against fire, heat, impact or another potentially harmful event or occurrence comprises positioning an outer encompassing member around the cable or cable bundle, wherein a first space is defined between the outer encompassing member and the cable or cable bundle. The method additionally includes positioning a first fill material within the first space to at least partially fill the first space. In some embodiments, the first fill material comprises vermiculite and ceramic.

In some embodiments, the fill material additionally comprises one or more of the following: resin, rubber or other elastomeric materials, other polymers, reinforcing fibers (e.g., carbon, glass, aramid, steel, other reinforcing fibers), epoxies, grouts, cement or other cementitious materials, steel, alloys or other metals, granite, wood or paper-based materials and felts. In other embodiments, the method further includes placing at least one ceramic tile within the first space. In other embodiments, the first space comprises at least one compressible or dampening member or material (e.g., a spring, polyurethane, etc.).

According to some embodiments, the method additionally includes positioning an inner encompassing member around the cable or cable bundle, wherein the inner encompassing member is positioned within the first space, wherein a second space is defined between the outer encompassing member and the inner encompassing member, and wherein a third space is defined between the inner encompassing member and the cable or cable bundle. In one embodiment, the third space permits the first encompassing member, the second encompassing member and the fill material to be slidably moved relative to the cable or cable bundle. In one embodiment, the second space comprises at least one of a fill material, a tile, a compressible or dampening member and/or any other item or material.

In some embodiments, the method additionally comprises placing one or more outer layers or coats along an exterior of the outer encompassing member. In one embodiment, the outer layer or coat comprises fiber reinforced polymer (e.g., carbon fiber reinforced polymer or glass fiber reinforced polymer). In some embodiments, the outer encompassing member comprises a metal and/or an alloy (e.g., steel, high strength steel alloy, etc.). In several embodiments, the outer encompassing member comprises a polymer. In some embodiments, the outer encompassing member is prefabricated. In other embodiments, the outer encompassing member comprises a unitary structure. In one embodiment, the outer encompassing member comprises at least two separate portions configured to be permanently or removably secured to one another.

BRIEF DESCRIPTION OF THE DRAWINGS

These and other features, aspects and advantages of the present application are described with reference to drawings of certain preferred embodiments, which are intended to illustrate, but not to limit, the present disclosure. The drawings include seventeen (17) figures. It is to be understood that the attached drawings are for the purpose of illustrating concepts disclosed in the present application and may not be to scale.

DETAILED DESCRIPTION OF THE PREFERRED EMBODIMENTS

Figure 1:
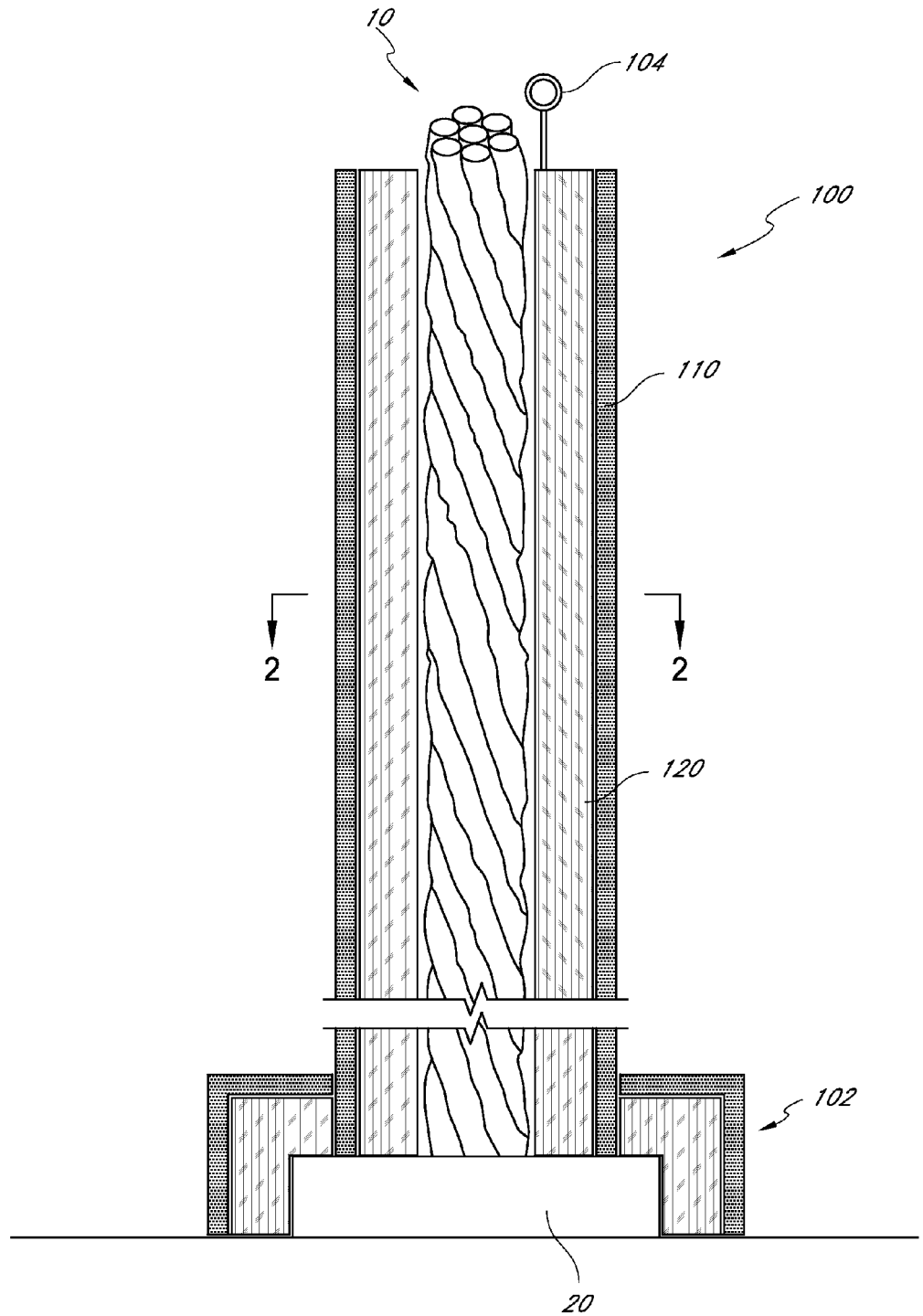
FIG. 1 illustrates a vertical cross-sectional view of one embodiment of a cable protection system.

FIG. 1 illustrates a cross-sectional view of a protection system 100 for a structural cable 10. Any of the protection system embodiments disclosed herein can be used to shield and/or otherwise protect a cable and/or similar member of a bridge or other structure against a threat to its integrity. For instance, in some embodiments, the cable comprises a tension cable used in a bridge (e.g., suspension bridge, cable-stayed bridge, etc.) or other structure (building, tower, etc.). In some embodiments, such cables that receive one or more forms of protection, as descried herein, are pre-tensioned or post-tensioned. The cable 10 can include one or more strands, as desired or required for a particular structural design. For example, in some embodiments, the cable 10 comprises a plurality or cluster of individual stands or components that are braided, twisted or otherwise configured to remain as a unitary item or a monolithic configuration. In one embodiment, a cable includes a bundle of individual and/or braided cables that are in close proximity to one another. Thus, as used herein, the term "cable" is a broad term and refers, without limitation, to a single-strand cable, a multi-strand cable, a cluster or bundle of adjacent single-stand or multi-strand cables, any other structural member intended to provide tension resistance, other non-structural members that may need protection and/or the like. However, the various embodiments illustrated and discussed herein, or variations thereof, can be used to protect any other structural or non-structural component, such as, for example, a rod, wire, column, beam, pipe, electrical conduit, duct and/or the like.

Depending on a particular structural design or configuration, a cable 10 can be secured to one or more adjacent members, portions or surfaces (e.g., walls, foundations, slabs, connectors, etc.) along one or more cable locations (e.g., upper and/or lower end of the cable, middle or intermediate portion of the cable, etc.). For example, in the embodiment illustrated in FIG. 1, a bottom portion of the cable 10 is coupled or attached to a cable connector 20. The cable connector 20 can be designed to ensure that the cable 10 and/or other member or component remain securely connected thereto. Similar retaining features or members can be included along the top, middle and/or any other portion of a cable 10.

Figure 2:
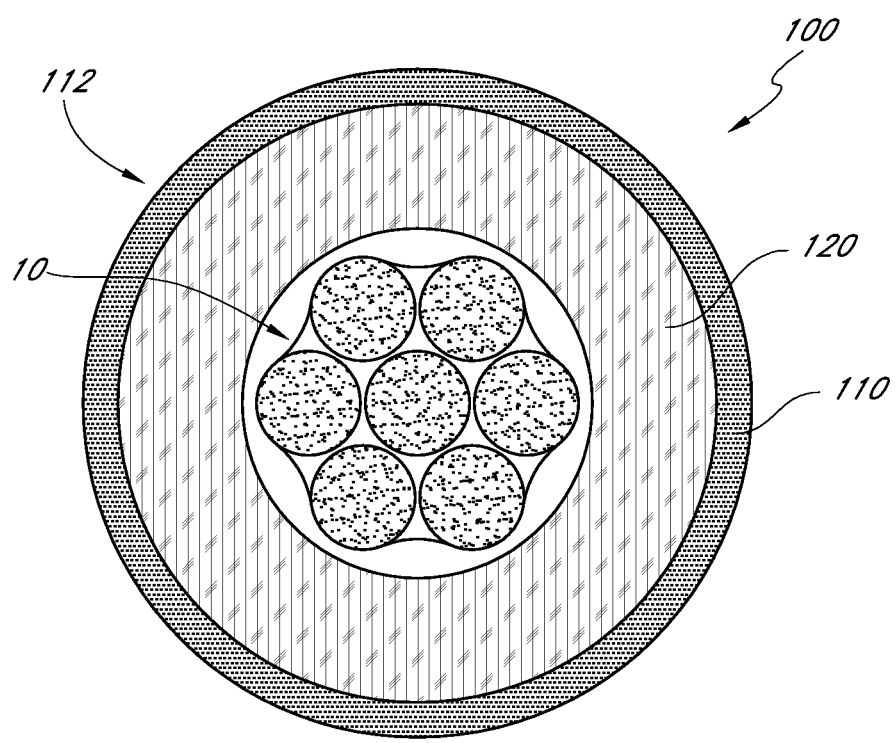
FIG. 2 illustrates a horizontal cross-sectional view taken along the cable protection system of FIG. 1.

With reference to the horizontal cross-sectional view of FIG. 2, the cable protection system 100 can include one or more outer layers 110, shells, coatings and/or other encompassing members or components. As shown, such an outer layer, shell or other encompassing member 110 can be configured to generally surround one or more internal materials or components. For example, in the depicted embodiment, the protection system 100 comprises one or more encompassing members 110 (e.g., layers, coatings, shells, jackets, plates, etc.) that generally define an internal annular area (e.g., between the encompassing member 110 and the cable or cable bundle 10).

According to some embodiments, the interior annular area comprises one or more filler materials 120, such as, one or more polymeric and/or elastomeric filler materials, sprays, coatings and/or the like. In one arrangement, the polymeric materials include urethane-polyurea, polyurea, polyurethane and/or the like. One or more other filler materials or components can be used, either in lieu of or in addition to urethane-polyurea, polyurea, polyurethane and/or other polymeric materials. For example, possible filler materials 120 include, but are not limited to, vermiculite, ceramic, resin, rubber or other elastomeric materials, other polymers, reinforcing fibers (e.g., carbon, glass, aramid, steel or other metal, other reinforcing fibers), epoxies, grouts, cement or other cementitious materials, steel, alloys or other metals, wood or paper-based materials, felts, any other material and/or combinations thereof. In some embodiments, filler materials include favorable heat dissipating and/or fire retardant or fire suppressive properties.

In some embodiments, the filler material 120 comprises a combination of vermiculite and ceramic materials. Such a combination can help protect the underlying cable or cable bundle 10 against fire and the heat generated therefrom. In other embodiments, in addition to vermiculite and ceramic, the filler material 120 comprises cement, reinforcing fibers, other polymers and/or other additives or components to help provide the necessary protective properties to the system 100. For example, the addition of fibers, polymeric components and/or other materials can increase the flexibility of the filler material 120. In other arrangements, such filler materials can help improve the strength, impact resistance, heat resistance and/or any other property of the protection system 100.

In addition, as discussed in greater detail herein, the interior area between the cable or cable bundle 10 and an outer shell, liner, coating or other encompassing member 110 of the protection system 100 can include one or more devices or other components, such as, for example, springs, force dampening materials, other compressible or impact-absorbing items or materials, tiles, other fire-resistant or fire-retardant items or materials, epoxy and/or the like.

In any of the embodiments disclosed herein, filler materials 120 can be applied to the interior space by spray, nozzle or other injection or filling tool, device or method. For example, the filler material 120 can be sprayed or otherwise directly or indirectly deposited on or near the periphery of a cable or cable bundle 10. Filler materials can be delivered into the interior space in a pressurized or non-pressurized (e.g., gravity, other flowable, etc.) manner, as desired or required. Subsequently, one or more layers or coats of an outer shell or encompassing member 110 can be sprayed or otherwise positioned along the outside of the filler material 120. In some arrangements, one or more intermediate layers (e.g., bonding layers, coatings, etc.) are included between the filler material 120 and the outer shell or encompassing member 110, as desired or required.

According to some embodiments, the filler material 120 and/or the outer shell or encompassing member 110 are prefabricated. The encompassing member 110 can include a jacket that comprises one or more materials, such as, for example, polyurethane, carbon fiber reinforced polymers, glass fiber reinforced polymer, aramid reinforcing fibers, steel or other metal fibers, other reinforcing polymers or materials, other thermoplastics or polymers, epoxies, other resins, grouts, cementitious materials, steel or other metals or alloys, granite, other stone or rock material, wood or paper-based materials and/or any other material. The encompassing member 110 can include one, two or more layers and/or components, as desired or required. The use of prefabricated components can facilitate assembly and other activities associated with securing a protective system 100 around a cable or cable bundle 10 or other member. Thus, the filler material 120 and/or the encompassing member 110 can comprise one or more sheet or sleeve-like items that are adapted to wrap around, either partially or completely, a cable 10. These items can be sized, shaped and otherwise adapted to surround a cable on their own or in conjunction with one or more additional items or components. The use of such pre-fabricated items can facilitate production, facilitate field installation procedures, reduce overall production and/or installation manpower and other resources, reduce installation and production costs, facilitate the application or other installation of additional layers or components around the exterior of the encompassing member and/or provide one or more other benefits or advantages.

As illustrated in FIGS. 1 and 2, a gap or space can be maintained between the exterior of the cable 10 and the protection system 100 (e.g., the interior portion of the filler material 120). Such a gap can advantageously permit the protection system 100 to be selectively moved relative to the adjacent cable 10 to provide access to the underlying cable or cable bundle 10. For example, the protection system 100 can be raised, lowered or otherwise moved to expose a portion of the cable or cable bundle for inspection and/or for any other purpose. After a cable 10 has been inspected or otherwise examined, the protection system 100 can be returned to its original position. However, in other arrangements, any gap between the cable 10 and an adjacent layer or component of the protection system 100 is reduced or eliminated, in accordance with specific design requirements or the specific application in which the system is used.

In order to assist with the handling (e.g., raising, lowering, etc.) of the protection system 100 relative to the cable 10, one or more fasteners 104 or other grasping members can be permanently or removably secured to the protection system 100. For instance, as illustrated in FIG. 1, a pull-up ring 104 can be attached the upper end of the filler material 120. Such pull-up rings 104 or other grasping members (e.g., hooks, clasps, other openings, etc.) can be sized, shaped and otherwise configured to receive a corresponding portion of a crane or other lifting device or system. Accordingly, in some embodiments, the filler material 120 is bonded or otherwise secured to the adjacent encompassing member 110 or other component so that the entire protection system 100 can be selectively raised, lowered or otherwise moved as a unitary structure. In other arrangements, however, two or more of the various layers or components of the protection system 100 are not attached to each other. Thus, two or more of such layers or components may need to be removed as separate items (e.g., in separate steps).

One or more additional layers or other components can be placed along the outside of the outer encompassing member 110 to help provide certain structural and/or aesthetic characteristics, as desired or required for a particular application or use. For example, one or more layers of the rubber, fiber reinforced polymer (e.g., resin impregnated fiber sheets, roving or bundles, etc.) and/or the like can be affixed along the exterior of the jacket or outer member 110. In some embodiments, the fiber reinforced layers can be used to provide additional protective characteristics, to hold other additional members (e.g., rubber) in place and/or perform one or more other functions, as required or desired. Such layers can include carbon fiber reinforced polymer (CFRP), glass fiber reinforced polymer (GFRP), aramid fiber reinforced polymer (AFRP) and/or the like. In some embodiments, such additional layers are provided as sheets, strips, splayed roving or bundles and/or in any other form, as desired or required. Such fiber reinforced polymers, rubbers and/or other exterior layers, coatings and/or the like can provide a protective and/or sacrificial role for a particular type of potentially harmful event or other occurrence (e.g., fires, heat generating events, sawing or cutting events, blasts, impacts, etc.). Any other type of coatings, layers and/or components can be used to provide the desired or required structural, protective and/or aesthetic characteristics to a protection system 100.

With continued reference to FIG. 1, the protection system 100 can include a lower portion 102 that is configured to protect a cable 10 at or near the interface between the cable 10 and an adjacent connection point (e.g., cable connector 20). Such an extension 102 can be continuous or separate from the main portion of the protection system 100, as desired or required.

As noted above, the outer encompassing member 110 can include a jacket or shell that is configured to partially or completely surround a cable or cable bundle 10. In accordance with at least some of the embodiments disclosed herein, a protection system can include one, two or more jackets or shells, as desired or required. Such shells or jackets can be concentric to each other or non-concentric to one another. In addition, the shapes of such shells or jackets can vary in accordance with a specific design or application. In some arrangements, a shell or jacket can comprise a generally circular, oval, square, other rectangular, pentagonal, hexagonal, octagonal, other polygonal, irregular and/or any other shape.

Further, in some embodiments, the outer member 110 includes a resilient sleeve having one or more slits, joints 112 and/or other features intended to allow the sleeve to selectively radially expand or contract. Thus, the outer member 110 can be circumferentially stretched, opened or expanded along the slit 112 or other feature to selectively place the outer member 110 around the cable 10. Alternatively, one or more hinges or other connections can be used to circumferentially expand the outer member 110. This can be particularly important when the jacket, shell, layer or other type of encompassing member comprises rigid, semi-rigid or less flexible materials (e.g., metals, alloys, etc.). In other embodiments, the jacket or shell 110 comprises two, three or more separate portions that are configured to be removably or permanently secured to each other. As noted above, the encompassing member 110 can comprise one or more materials, such as, for example, polyurethane, other polymers, metals or alloys (e.g., steel) and/or the like, depending on the target design parameters (e.g., strength, weight, durability, etc.). In some embodiments, the jacket or shell is reinforced with one or more materials (e.g., rubber, carbon fiber, glass fiber, metal fiber, ceramic, other additives, etc.). In embodiments where the outer member 110 includes a longitudinal slit 112 or other opening, a heat seal or other attachment device or method (e.g., welds, screws, bolts, clips, rivets, other fasteners, adhesives, etc.) can be utilized to permanently or temporarily close such a slit or other opening.

Figure 3:
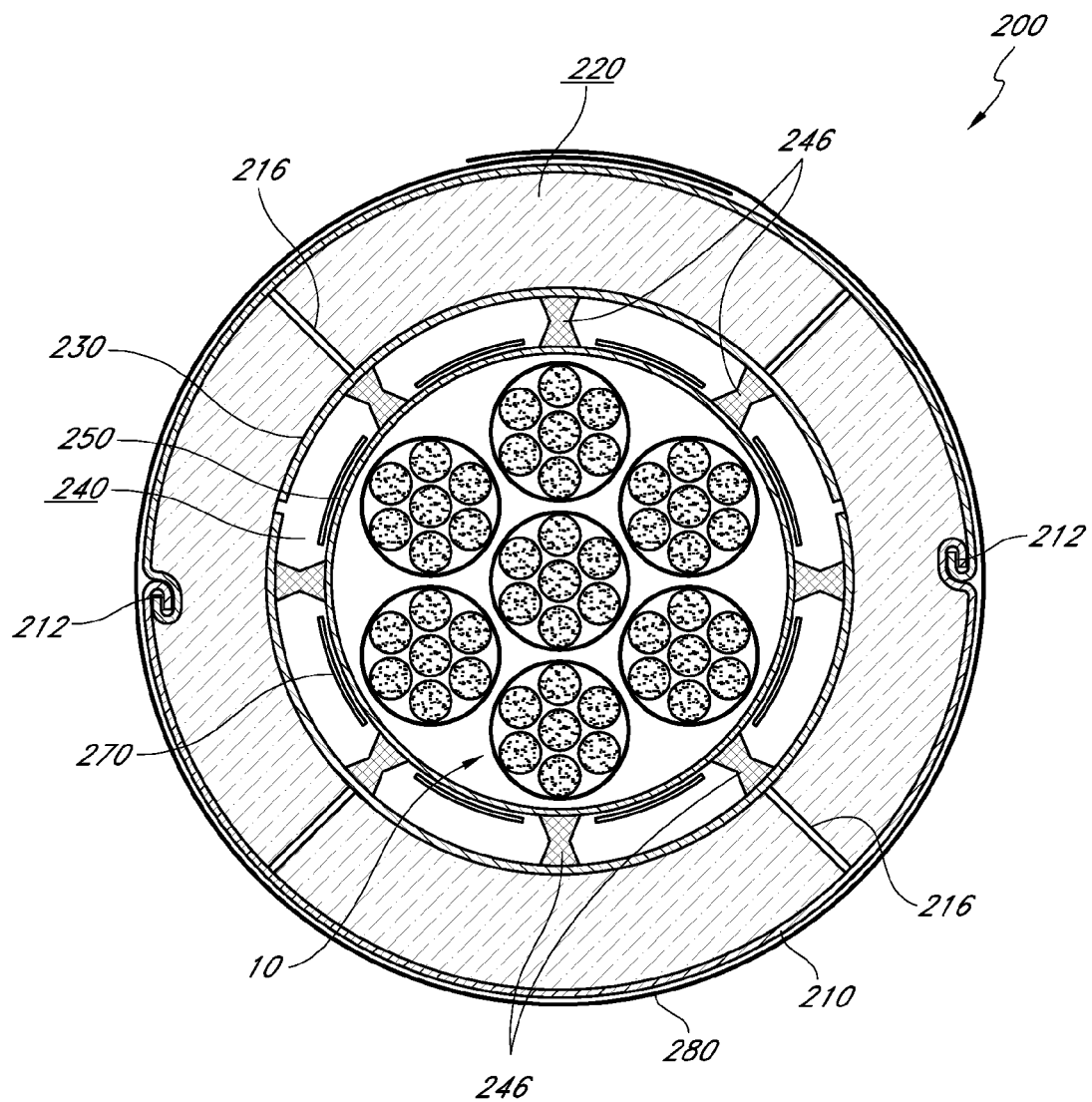
FIG. 3 illustrates a horizontal cross-sectional view of a cable protection system according to another embodiment.

Another embodiment of a cable protection system 200 is illustrated in the horizontal cross-sectional view of FIG. 3. As shown, the protection system 200 can surround one or more cables 10 (e.g., bridge suspension or suspender cables, other structural members, etc.). In some arrangements, a cable protection system 200 can include two or more distinct annular layers or portions, in order to provide the desired level of protection to the cables 10 passing therethrough. For example, the system 200 illustrated in FIG. 3 comprises an innermost zone having a plurality of springs or other compressible members 246. In the depicted arrangement, a total of eight compressible members 246 are oriented at generally regular (e.g., equally-spaced or substantially equally-spaced) intervals around the cables 10. Alternatively, however, the quantity, orientation, type and/or other details regarding the springs or compressible members 246 can vary, as desired or required.

According to some embodiments, the compressible members 246 comprise polyurethane, other polymers or elastomers and/or any other flexible materials or components configured to resiliently or non-resiliently compress or otherwise absorb impact. As shown, the compressible members 246 can include a tapered, hourglass shape, with the larger cross-sectional areas positioned along each end. In alternative embodiments, the springs or compressible members 246 can include any other shape, size or configuration. In other embodiments, the compressible members 246 comprise one or more force dampening materials, such as, for example, foams (e.g., high density foam), viscoelastic dampers, air gaps, coil springs and/or other dampening materials or items. Such compressible members can be incorporated into any of the embodiments disclosed herein, or equivalents thereof.

With continued reference to FIG. 3, the compressible members 246 can be positioned within an annular space defined between two adjacent shells, jackets, rings or other encompassing members 230, 250. As discussed above with reference to FIGS. 1 and 2, such encompassing members 230, 250 can be pre-fabricated. For example, each shell or other encompassing member can comprise a unitary structure or two or more portions that are configured to permanently or removably attach to one another (e.g., using a joint, hinge, other connector, etc.). Alternatively, these members 230, 250 can be formed, at least partially, in the field by spraying, casting and/or otherwise applying the desired materials around one or more cables or cable bundles 10. In some embodiments, the springs or other compressible members 246 are secured to the adjacent shells, jackets or other encompassing members 230, 250 using one or more adhesives, welds, fasteners, friction fit connections, snap-fit connections and/or any other attachment method or device. Regardless of their exact design and configuration, the compressible members 246, together with the adjacent shells, jackets or other encompassing members 230, 250, can be advantageously configured to dissipate at least a portion of any impact forces (e.g., from a blast, ramming device, other force imparting object or process, projectile, etc.) directed toward the cables or cable bundles 10.

According to some embodiments, the protection system 200 includes one or more sensors 270 that are configured to provide feedback regarding the status of the system. Such feedback can be used, for example, to determine if a cable 10 and/or the encompassing protection system 200 has been compromised or is otherwise threatened. For instance, in one embodiment, the protection system 200 comprises a plurality of fiber-optic structural monitoring sensors, other impact sensors, stress or strain sensors, temperature sensors and/or the like. Such sensors 270 can be included on or near the cables or cable bundles 10 and/or on, near or within the protection system 200 configured to shield the cables 10. In some arrangements, as illustrated in FIG. 3, a plurality of fiber-optic structural monitoring sensors 270 are located within the annular space 240 between adjacent shells or encompassing members 230, 250. In other embodiments, however, the type, quantity, location, orientation and/or other details regarding the sensors can vary, as desired or required. For instance, such sensors can be provided within or near the filler materials (e.g., ceramic, vermiculite, tiles, etc.) of an outer encasement, within or near one or more layers positioned along the outside of the system (e.g., rubber, fiber reinforced layers, etc.) and/or the like. One or more sensors, as discussed above, can be included in any of the embodiments disclosed herein.

With continued reference to FIG. 3, the annular space 240 located between the innermost shell or encompassing member 250 and the immediately adjacent shell or encompassing member 230 can remain unfilled, thereby forming an air void or gap. Such a configuration can be implemented into any of the embodiments disclosed herein, regardless of how such embodiments are depicted in the accompanying figures. Alternatively, such a space 240 can be filled, at least partially, with one or more filler materials. In some embodiments, such filler materials provide fire or heat protection, impact protection and/or any other type of protection to the cables or cable bundles 10. For instance, the annular space 240 can comprise vermiculite, ceramic, cement, reinforcing fibers, other polymeric or elastomeric materials, tiles, felts and/or the like, either in addition to or in lieu of the compressible members 246. As discussed in greater detail herein, the filler materials can be directed into the targeted interior space(s) of a protection system using one or more filling methods or devices. For example, filler materials can be gravity fed or directed into an interior space using a pressurized method (e.g., spraying, higher pressure nozzle, etc.). According to some embodiments, such filler materials are configured to set or solidity, at least partially, once within one or more targeted interior spaces (e.g., annular spaces) of the protection system.

As illustrated in FIG. 3, the cable protection system 200 can include one or more additional shells, jackets or other encompassing members 210. Such a "split" configuration can be incorporated into any other protection system disclosed herein, or variation thereof. These types of designs can assist in the installation, removal and/or other manipulation of the system. With continued attention to the embodiment depicted in FIG. 3, the outer member 210 comprises two separate half-cylindrical portions that are secured to each other using interlocking end joints 212. However, the number of portions that comprise the outer member 210, the type of joints or other connection features and/or other details related to the outer encompassing member 210 can vary in accordance with a particular set of design parameters. In some arrangements, one or more ribs 216, struts or other reinforcing members or features extend radially between the outer shell 210 and the immediately adjacent shell 230. The use of such ribs or other members 216 can help enhance the structural characteristics of a protection system and/or provide additional shielding against impact and other forces and moments that may be directed in the direction of the underlying cables or cable bundles 10.

With continued reference to FIG. 3, the annular space 220 defined between the outer shell, jacket, layer or other encompassing member 210 and the immediately adjacent encompassing member 230 can be filled, either completely or partially, with one or more filler materials. Such filler materials can include one or more sprays, layers (e.g., fabrics, blankets, etc.), coatings and/or the like. In some arrangements, the filler materials include, but are not limited to, vermiculite, ceramic, resin, rubber or other elastomeric materials, urethane-polyurea, polyurea, polyurethane, other polymers, reinforcing fibers (e.g., carbon, glass, aramid, steel or other metal, other reinforcing fibers), epoxies, grouts, cement or other cementitious materials, steel, alloys or other metals, granite, other stone or rock material, wood or paper-based materials, tiles, felts, any other material and/or combinations thereof. In some embodiments, filler materials include favorable heat dissipating and/or fire retardant or fire suppressive properties.

In some embodiments, the filler material that is placed within one or more of the annular spaces 220 of the protection system comprises a combination of vermiculite and ceramic materials, either alone or in conjunction with one or more other materials. As noted herein, such a combination can help protect the underlying cable or cable bundle 10 against fire, the heat generated therefrom and/or other threats (e.g., cutting, impact, etc.). In other embodiments, in addition to vermiculite and ceramic, the filler material comprises cement, reinforcing fibers, other polymers or elastomers, spring or dampeners and/or other additives to provide the necessary properties to the protection system 200.

The various shells, jackets or other encompassing members included in a protection system 200 can comprise one or more materials, depending on the targeted design parameters. For example, in one embodiment, the outer member 210 and one or more of the interior jackets or other encompassing members 230, 250 comprise steel (e.g., high strength steel alloy), other metals or alloys, polyurethane, carbon fiber reinforced polymers, glass fiber reinforced polymer, aramid reinforcing fibers, steel or other metal fibers, other reinforcing polymers or materials, other thermoplastics or polymers, epoxies, other resins, grouts, cementitious materials, granite, other stone or rock material, wood-based or paper-based materials, one or more other materials and/or combinations thereof. The thickness and/or other properties of such shells, jackets or other encompassing members 210, 230, 250 can be selected based on, at least in part, the size of the cable or cable bundle, the tension applied to the cable or cable bundle, the fire, heat, impact and/or other threatening event or occurrence against which the system 200 is intended to protect, the design weight of the system and/or any other factor or consideration.

As noted in greater detail herein and illustrated, for example, in FIG. 3, one or more additional layers and/or components can be placed along the outside of the outer member 210 to help provide the required or desired structural and/or aesthetic characteristics. For example, one or more layers of fiber reinforced polymer (e.g., resin impregnated fiber sheets, roving or bundles, etc.) can be affixed along the exterior of the jacket or outer member 210. Such layers can include CFRP, GFRP, AFRP and/or the like. In some embodiments, such additional layers are provided as sheets, strips, splayed roving or bundles and/or in any other form, as desired or required. In addition, one or more layers or sheets of other materials can be positioned along the outside of the outer member 210, such as, for example, rubbers (neoprene, natural rubber, etc.), other elastomeric materials, other flexible, rigid and/or semi-rigid materials and/or the like. Such exterior layers, coatings and/or the like can provide a protective and/or sacrificial role for a particular type of potentially harmful event or other occurrence (e.g., fire, heat, blast, impact, etc.). For instance, the presence of one or more rubber materials can help deflect forces away from the cables during a blast or other impact-generating event or occurrence. In some embodiments, any other type of coatings can be used to provide the desired or required structural, protective and/or aesthetic characteristics to a protection system 200.

Figure 4:
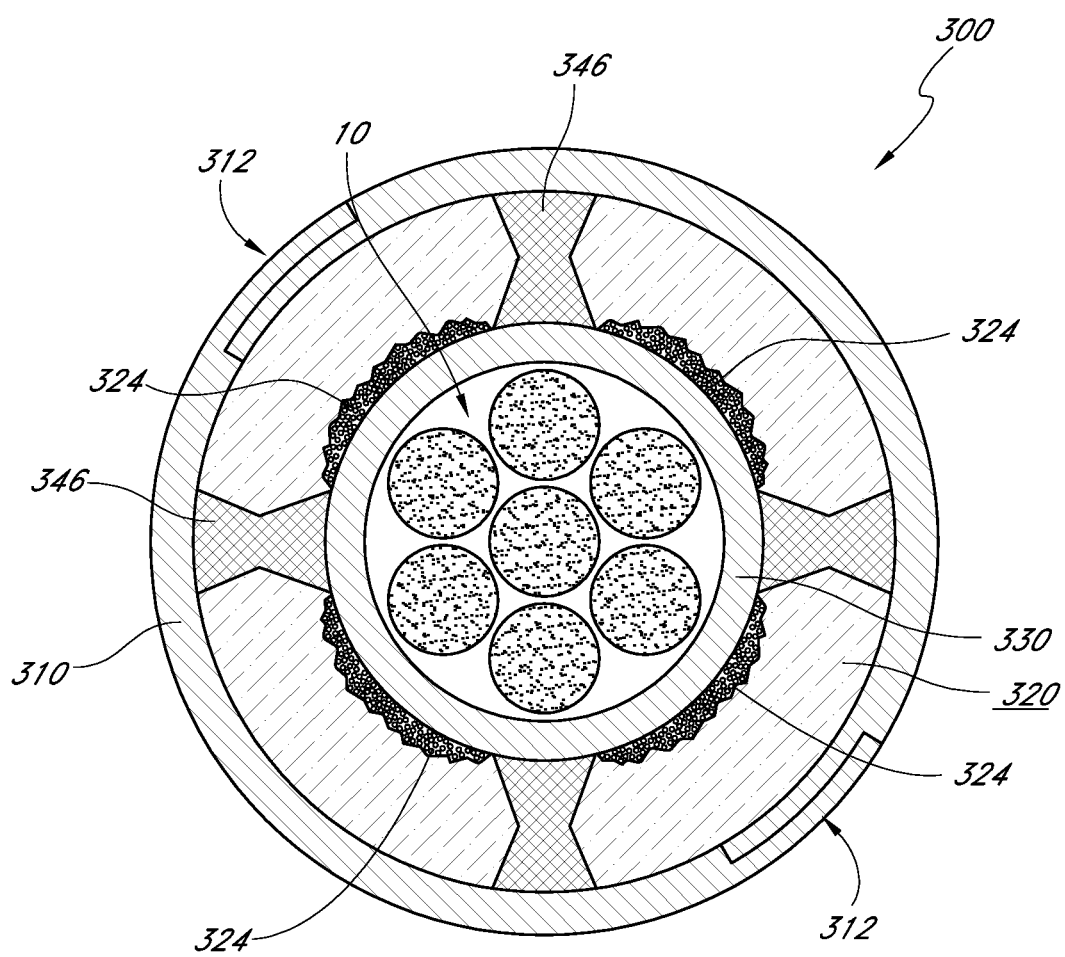
FIG. 4 illustrates a horizontal cross-sectional view of a cable protection system according to yet another embodiment.
Figure 5:
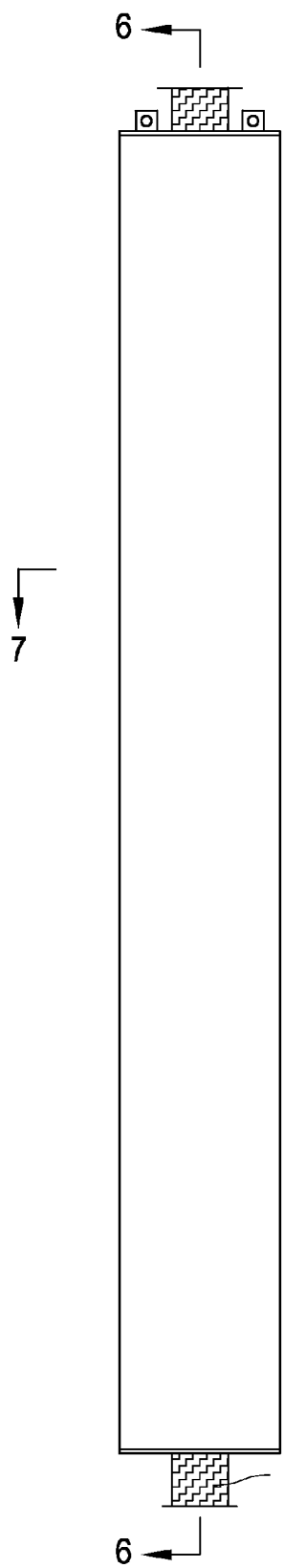
FIG. 5 illustrates a side view of a cable protection system according to one embodiment.

FIG. 4 illustrates a horizontal cross-sectional view of another embodiment of a protection system 300 adapted to surround one or more cables or cable bundles 10. As shown, the cable protection system 300 can include an inner shell, jacket or other encompassing member 330 and an outer shell, jacket or other encompassing member 310. As with other embodiments disclosed herein, a gap or space can be provided between the inner encompassing member 330 and the cables or cable bundles 10 in order to allow the protection system 300 to be slidably moved (e.g., raised, lowered, etc.) relative to the cables or cable bundles 10. This can facilitate the inspection of the cables (e.g., periodic, following a particular threatening event or occurrence, etc.) and/or any other activity (e.g., maintenance, replacement, repairs, etc.).

As discussed above with reference to the arrangements illustrated in FIGS. 1-3, the protection system 300 can include one or more compressible members 346 (e.g., springs, polyurethane or other polymeric hourglass-shaped devices, etc.) within the annular space 320 located between the adjacent encompassing members 310, 330. However, in any of the embodiments disclosed herein, the protection system need not include any compressible members or devices. Thus, a protection system can be configured to withstand the necessary threatening events or occurrences (e.g., heat, torching, impact, sawing or other cutting, blasts, etc.) and provide the necessary protection to the underlying cables, bundles and/or other devices with only one or more shells or encompassing members, one or more filler materials positioned therein and/or one or more outer layers or components (e.g., rubber, fiber reinforced polymer layers, etc.), in accordance with at least some of the embodiments disclosed herein. Moreover, an annular space 320 can include one or more filler materials, either in addition to or in lieu of the compressible members 346. Possible filler materials include, but are not limited to, vermiculite, ceramic, resin, rubber or other elastomeric materials, urethane-polyurea, polyurea, polyurethane, other polymers, reinforcing fibers (e.g., carbon, glass, aramid, steel or other metal, other reinforcing fibers), epoxies, grouts, cement or other cementitious materials, steel, alloys or other metals, granite, other stone or rock material, wood or paper-based materials, tiles, felts, any other material and/or combinations thereof. Likewise, the outer and inner encompassing members 310, 330 can include steel (e.g., high strength steel alloy), other metals or alloys, polyurethane, carbon fiber reinforced polymers, glass fiber reinforced polymer, aramid reinforcing fibers, steel or other metal fibers, other reinforcing polymers or materials, other thermoplastics or polymers, epoxies, other resins, grouts, cementitious materials, granite, other stone or rock material, wood or paper-based materials, any other material and/or combinations thereof. The material, size, thickness, structural and other material properties (e.g., strength, flexibility, tensile and/or compressive strength, resistance to corrosion and other elements, etc.) and/or other properties of such shells, jackets or other encompassing members 310, 330 can be selected based on, at least in part, the size of the cables or cable bundles, the tension applied to the cables, the fire, heat, impact and/or other threatening event or occurrence against which the system 300 is intended to protect or any other factor or consideration.

With continued reference to FIG. 4, the outer shell or encompassing member 310 can include two (or more) separate portions that are configured to removably or permanently attach to each other. For example, in the depicted arrangement, the two semi-cylindrical portions of the outer member 310 comprise overlapping end joints 312 that are sized, shaped and otherwise adapted to mate and connect the portions to each other. In some embodiments, the joints 312 comprise a press-fit or snap-fit connection, one or more fasteners (e.g., screws, bolts, rivets, clips, etc.), welds, adhesives and/or any other attachment method or device. Such an overlapping joint or other connection method can be incorporated into any of the embodiments disclosed herein or variations thereof. Alternatively, any other connection or joining device, feature or method can be used to selectively open and/or close one or more encompassing members of a protection system.

According to some embodiments, one or more additional materials can be included in any of the protection system arrangements disclosed herein. For example, as illustrated in FIG. 4, one or more masses, injections or other deposits 324 of epoxy, grout, resin (e.g., unreinforced or reinforced), cement, other cementitious materials, other sealants and/or the like can be included along the inner jacket or encompassing member 330 and/or any other portion of the protection system 300 (e.g., along or near the outer member 310, within an interior of the annular space 320, adjacent to the cables or cable bundles 10, etc.), as desired or required. Such material injections or deposits 324 can provide additional protection to the cables against fire or heat, blasts, sawing or cutting, other impact events and/or any other potentially threatening event or occurrence. The material injections or deposits 324 can be applied within one or more portions of the protection system either intermittently (as shown in FIG. 4) or continuously. For example, in the illustrated embodiment, the deposits 324 are applied in four separate locations intermittently along or near the outer surface of the inner encompassing member or shell 330. In other arrangements, however, such deposits 324 can be deposited in a generally continuous manner along relative to one or more portions of the inner shell 330 and/or outer shell 310, between the shells 310, 330, along the exterior of the protection system 300 and/or the like.

As noted above with reference to the arrangements illustrated in FIGS. 1-3, one or more additional layers, coatings and/or other components can be placed along the outside of the outer member 310 to help provide certain desired or required structural and/or aesthetic characteristics. For example, one or more layers of fiber reinforced polymer (e.g., resin impregnated fiber sheets, roving or bundles, etc.) can be affixed along the exterior of the jacket or outer member 310. Such layers can include CFRP, GFRP, AFRP and/or the like. In some embodiments, one or more layers or sheets of rubber (e.g., neoprene, natural rubber, etc.), other elastomeric materials and/or other impact deflecting materials (e.g., polymers, metals or alloys, wood-based or paper-based materials, etc.) can be positioned along the outside of the outermost encompassing member or shell (or along any other portion of the protection system) to provide the desired properties to the system. For example, the inclusion of rubber and/or other layers can help deflect or otherwise reduce the effects of impacting forces to the system, and thus the underlying cables.

According to some embodiments, additional layers are provided as sheets, strips, splayed roving or bundles and/or in any other form, as desired or required. Such exterior layers, coatings and/or the like can provide a protective and/or sacrificial role for a particular type of potentially harmful event or other occurrence (e.g., fire, blast, impact, etc.). As discussed in greater detail herein, multiple (e.g., sometimes alternating) layers of rubber (and/or other elastomeric or impact deflecting materials) and fiber reinforced polymer layers (e.g., GRFP, CRFP, ARFP, etc.) can be positioned along the outside of a protection system.

Figure 6:
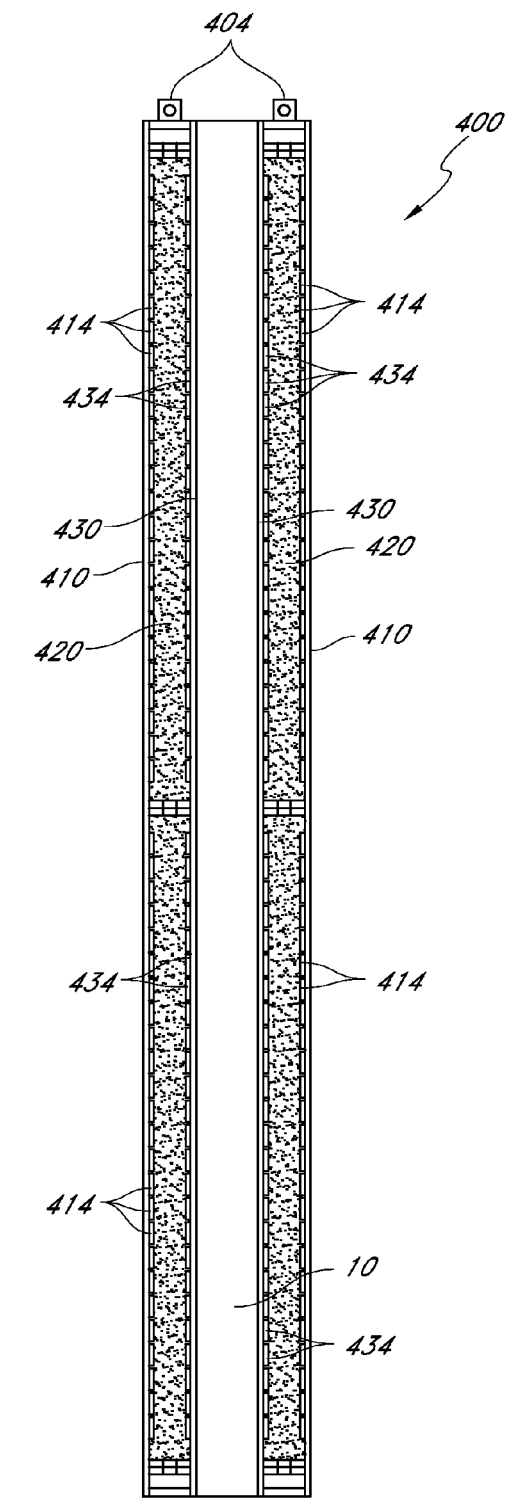
FIG. 6 illustrates a vertical cross-sectional view of the cable protection system of FIG. 5.
Figure 7:
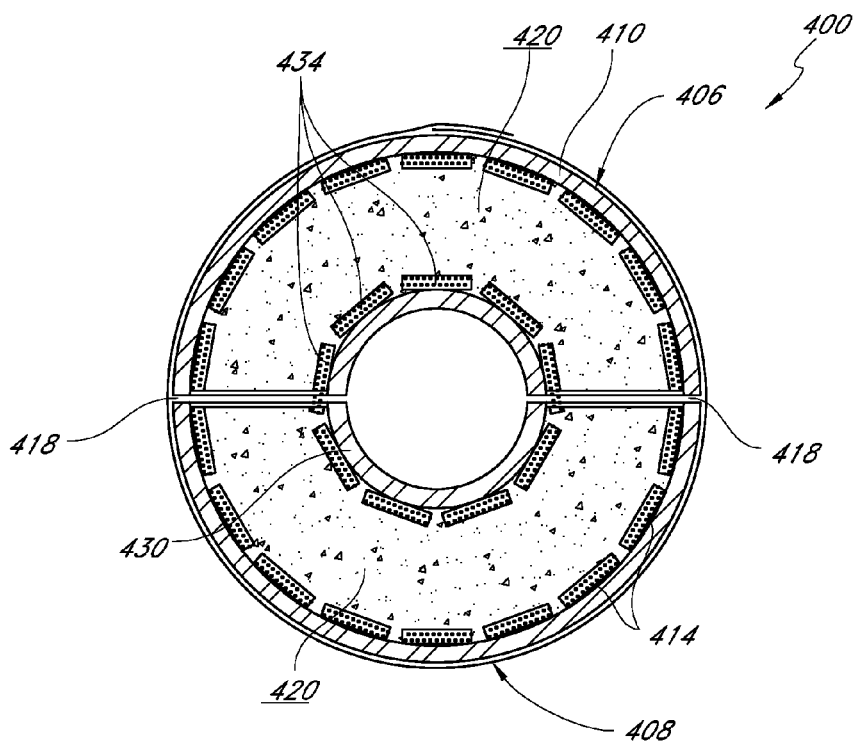
FIG. 7 illustrates a horizontal cross-sectional view of the cable protection system of FIG. 5.
Figure 8:
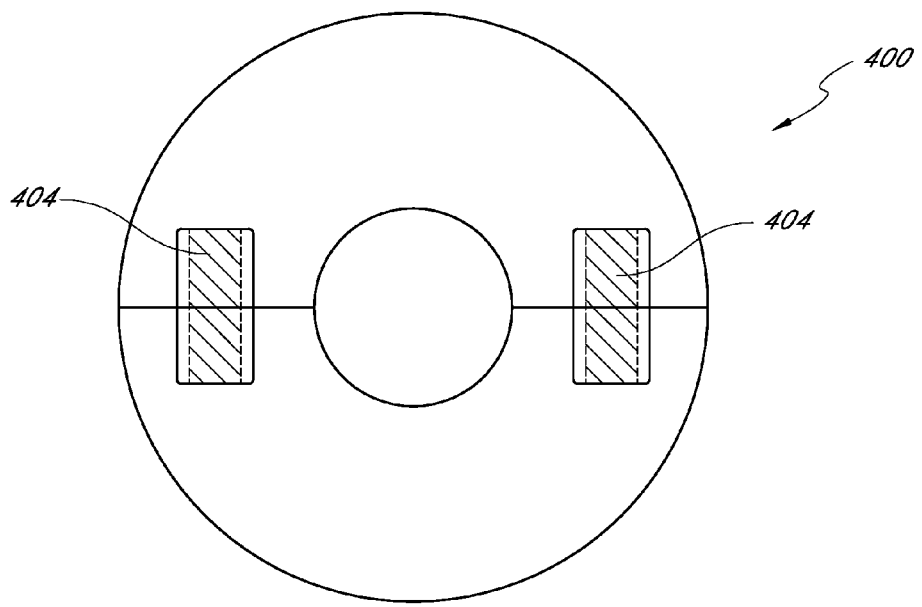
FIG. 8 illustrates a top view of the cable protection system of FIG. 5.

Yet another embodiment of a cable protection system 400 is illustrated in FIGS. 5-10. As shown, the protection system 400 can be configured to be placed around one or more cables or cable bundles 10 and can extend partially or completely along the length of such cables or cable bundles. As noted herein with reference to the embodiment illustrated in FIGS. 1 and 2, the depicted protection system 400 can include one or more rings or other grasping members 404. Such grasping members 404, which may be permanently or removably secured to one or more portions of the protection system 400, can facilitate in slidably moving the system 400 relative to the adjacent cables or cable bundles 10 (e.g., for inspection and/or for any other purpose). For example, as illustrated in FIGS. 6 and 8, an upper portion of the cable protection system 400 can comprise two rings 404, bolt housing members and/or any other devices that are sized, shaped and otherwise configured to receive a corresponding portion of a lifting device or system (e.g., crane, other machine-operated or manual lifting tool, etc.).

As illustrated in the horizontal cross-sectional view of FIG. 7, as with other arrangements disclosed herein, the protection system 400 can include an inner shell or encompassing member 430 and an outer shell or encompassing member 410. Each of the inner and/or outer encompassing members 430, 410 can comprise a generally unitary structure. Alternatively, as is the case in the arrangement depicted in FIG. 7, the inner and/or outer encompassing members 430, 410 can include two (or more) separate portions that are configured to secure to one another or to be positioned adjacent to one another. For example, as shown, a semi-circular portion of the inner encompassing member 430 and a corresponding semi-circular portion of the outer encompassing member 410 can be combined to form a cylindrical half (e.g., hemispherical portion) 406, 408 of the protection system 400. Such a cylindrical half can be configured to mate with and attach to a second cylindrical half 408, 406 to form a generally cylindrical protection system 400. In other embodiments, the generally cylindrical system can include three or more separate portions that are configured to permanently or removably secure to each other.

In some embodiments, one or both of the cylindrical halves 406, 408 comprise a gasket, seal or other cover surface or member 418 along the interface of the two halves. The gasket or other interface member 418 can include rubber, other elastomeric or polymeric materials, other compressible, resilient or flexible materials and/or the like. The use of rubber and/or other materials at such interfacing surfaces can help improve the mating between adjacent surfaces, and thus, may provide for a better connection between complimentary portions of a protection system 400. In addition, the use of such interface materials can help in the transport, handling, assembly and other aspects of working with the various components of a cable protection system. The use of two or more separate portions that are configured to mate or otherwise come in proximity with one another to form a protection system can be incorporated into any protection system embodiment disclosed herein or variation thereof.

With continued reference to FIG. 7, one or more of the annular regions 420 defined between the outer shell or encompassing member 410 and the inner shell or encompassing member 430 can include a filler material. As discussed in greater detail with reference to other embodiments herein, such as those illustrated in FIGS. 1-4 and 11A-14B, the annular region(s) 420 can include, without limitation, vermiculite, ceramic, resin, rubber or other elastomeric materials, urethane-polyurea, polyurea, polyurethane, other polymers, reinforcing fibers (e.g., carbon, glass, aramid, steel or other metal, other reinforcing fibers), epoxies, grouts, cement or other cementitious materials, steel, alloys or other metals, granite, other stone or rock material, wood or paper-based materials, ceramic or other tiles, felts, any other material and/or combinations thereof. The filler materials that are positioned within the annular space 420 can be selected based on the desired properties of the protection system, such as, for example, heat resistance, fire resistance, sawing or cutting resistance, blast or impact resistance and/or the like. One embodiment wherein the filler material includes a mixture of vermiculite and ceramic can be particularly helpful for fire or heat resistance. In other arrangements, the filler material comprises one or more additional materials, such as, for example, resins, fiber reinforcement (e.g., carbon fiber, glass fibers, aramid fibers, steel or other metal fibers, etc.), cement, other polymeric materials and/or the like, either in addition to or in lieu of vermiculite and ceramic. As noted above, filler materials can be deposited within one or more targeted void or space of a protection system either in the field or prior to delivery to an installation site. Further, such filler materials can be directed to a specific space via gravity or a pressurized method (e.g., spraying), as desired or required.

According to some embodiments, in order to further enhance certain qualities of the protection system 400, including, for example, resistance to fires and heat resulting therefrom, sawing, other types of cutting or potentially comprising activities, abrasion and the like, a plurality of tile 414, 434 can be positioned within, on or near the system 400. In some arrangements, the tile 414, 434 comprises ceramic tile or any other type of standard or non-standard tile that offers favorable resistance to heat. The tile can include one or more other materials, such as, for example, porcelain, quarry, granite, rock, clay, composites, other natural or synthetic materials and/or the like, either in lieu of or in addition to ceramic. In some embodiments, the tile is standard, off-the-shelf tile, which may be provided as individual tile or in sheets (e.g., connected with a backing layer). The tile 414, 434 can include any shape and size. For instance, in one embodiment, the individual tile is approximately ¾-inch by ¾-inch. Alternatively, however, the tile can include a different shape (e.g., non-square, rectangular, triangular, other polygonal, circular, oval, irregular, etc.) and/or size, as desired or required. Tiles can be included in any of the protection system embodiments disclosed herein, regardless of whether such tile is illustrated in the corresponding figures of such embodiments.

With continued reference to FIG. 7, tiles can be positioned along or near one or more surfaces of the outer and/or inner encompassing members 410, 430. For example, in the depicted embodiment, tiles 414 are secured to the interior wall of the outer shell or other encompassing member 410. Likewise, a plurality of tile 434 can be secured to the exterior wall of the inner shell or other encompassing member 430. As shown, the tile 414, 434 can be placed in a manner that creates relatively small gaps therebetween. Alternatively, the tile 414, 434 can be positioned end-to-end, so that there little if any gap space exists between adjacent tiles. For example, in some embodiments, there is no gap or substantially no gap between adjacent tiles. In other embodiments, the gap between adjacent tiles is between about 0 and ½ inches (e.g., approximately ¹⁄₁₆, ⅛, ³⁄₁₆, ¼, ⁵⁄₁₆, ⅜, ⁷⁄₁₆, ½ inch, lengths between the foregoing values, etc.). In other embodiments, the distance between adjacent tiles can be greater than about ½ inches (e.g., approximately ½, ¾, 1, 1½, 2, 3 inches, greater than 3 inches, etc.), as desired or required. The foregoing disclosure regarding separation distance applies to both adjacent tiles in the horizontal and vertical directions. Within a particular protection system, the separation distance between adjacent tiles can be substantially consistent or vary, as desired or required. In addition, as illustrated in the cross-sectional view of FIG. 6, the tile 414, 434 can also be positioned, either continuously or intermittently, along a vertical portion of the protection system 400. Thus, as noted above, tile 414, 434 can be installed both in the vertical and horizontal directions.

According to some embodiments, tiles included in a particular protection system are secured to the inner and/or outer members using adhesives, grout, epoxy, other bonding agents, fasteners and/or any other attachment device or method. In other embodiments, the placement of the filler material within the annular space(s) 420 helps to urge the tile toward the corresponding surface or location, with or without the use of adhesives, bonding agents and/or other attachment devices or methods. Thus, is such configurations, the tile is secured to the protection system, at least in part, using the filler materials positioned within the corresponding annular or other space. In some embodiments, tile is provided along one or more other portions of the protection system 400, such as, for example, along the exterior surface of the outer shell or other encompassing member, along the interior surface of the inner shell or other encompassing member (e.g., adjacent to the cable or cable bundle 10), within the annular space 420 (e.g., near or far from adjacent walls of the inner and/or outer encompassing members) and/or the like. As noted above, tile can be incorporated into any of the protection system embodiments disclosed herein or variations thereof.

As noted in greater detail with reference to other embodiments herein, one or more additional layers or other components can be placed along the outside of the outer encompassing member 410 to help provide certain desired or required structural and/or aesthetic characteristics. For example, one or more layers of rubber (e.g., neoprene, natural rubber, etc.), other elastomeric or polymeric materials, fiber reinforced polymer (e.g., resin impregnated fiber sheets, roving or bundles, etc.) and/or the like can be affixed along the exterior of the jacket or outer member 410. In some embodiments, such additional layers are provided as layers, sheets, strips, splayed roving or bundles and/or in any other form, as desired or required. Such exterior layers, coatings and/or the like can provide a protective and/or sacrificial role for a particular type of potentially harmful event or other occurrence (e.g., fire, blast, impact, etc.). Certain materials, such as, for example, rubber, can help deflect or re-direct, at least partially, potentially dangerous and damaging forces (e.g., blast or other impact forces, etc.) away from the protection system and the cable or cable bundles situated therein. In some embodiments, other types of coatings are used to provide the desired or required structural, protective and/or aesthetic characteristics to a protection system 400.

In some embodiments, grout, epoxy and/or other sealants or filler materials are used to fill all or some of the space that exists between the outside of the cable or cable bundles and the interior wall of a cable protection system. Thus, a protection system in accordance with any of the embodiments disclosed herein, or equivalents thereof, can be provided in certain standard or pre-determined diameters or sizes to accommodate a variety of cable or cable bundle sizes. Alternatively, each cable protection system can be specially sized and designed according to the specific outside diameter or other dimension of the cable or cable bundle being protected. In addition, it may be desirable, in certain embodiments, to not fill, either completely or partially, any space that exists between the outside of the cable or cable bundle and the adjacent interior surface of the protection system. As noted herein, the maintenance of such an air gap can facilitate slidably removing the protection system (e.g., at least temporarily) to inspect the underlying cables and/or for performing some other activity or task (e.g., repair, replacement, retrofit, etc.), as desired or required.

By eliminating the use of concrete, cement, grout and/or simmer materials as fillers in at least some of the protection system embodiments disclosed herein, the overall weight of a protection system can be advantageously decreased. For example, in some arrangements, the weight of the protection system can be lowered by half or more than half by reducing or eliminating concrete, grout and/or other relatively heavy materials. In one embodiment, the weight of the cable protection system is around 60 pounds per cubic foot (e.g., between about 40-80 pounds per cubic foot), which may be less than half of the anticipated weight of systems comprising cement, concrete and/or similar filler materials. Such relatively heavier protection systems can reduce the load on bridge cables or other structural components. Thus, the various embodiments disclosed herein that do not comprise cement, concrete, grout and/or other relatively heavy binding materials can help maintain the integrity of a bridge's or other structure's overall structural design, while still protecting the cable, cable bundles and/or other members around which such protection systems are placed. In addition, the capital and installation costs of the various protection systems disclosed herein or equivalents thereof can also be advantageously decreased.

The inner and/or outer shell or other encompassing members 430, 410 of the protection system 400 can include metals and/or alloys (e.g., steel of various grades and types, carbon steel, stainless steel, high strength steel alloy, etc.), polyurethane, carbon fiber reinforced polymers, glass fiber reinforced polymer, aramid reinforcing fibers, steel or other metal fibers, other reinforcing polymers or materials, other thermoplastics or polymers, epoxies, other resins, grouts, cementitious materials, granite, other stone or rock material, wood or paper-based materials, any other material and/or combinations thereof. The thickness and/or other properties of such shells, jackets or other encompassing members 410, 430 can be selected based on, at least in part, the size of the cables, the tension applied to the cables, the fire, heat, impact and/or other threatening event or occurrence against which the system 400 is intended to protect, a target design weight and/or any other factor or consideration. In addition, one or more protective coatings and/or layers can be placed along the inside and/or outside of such encompassing members, as desired or required. For example, such liners, coatings, layers and/or other devices or materials can help improve the strength or durability of the system, can provide anti-corrosive and/or similar properties to certain components of the system and/or provide one or more other advantages or benefits.

Figure 9:
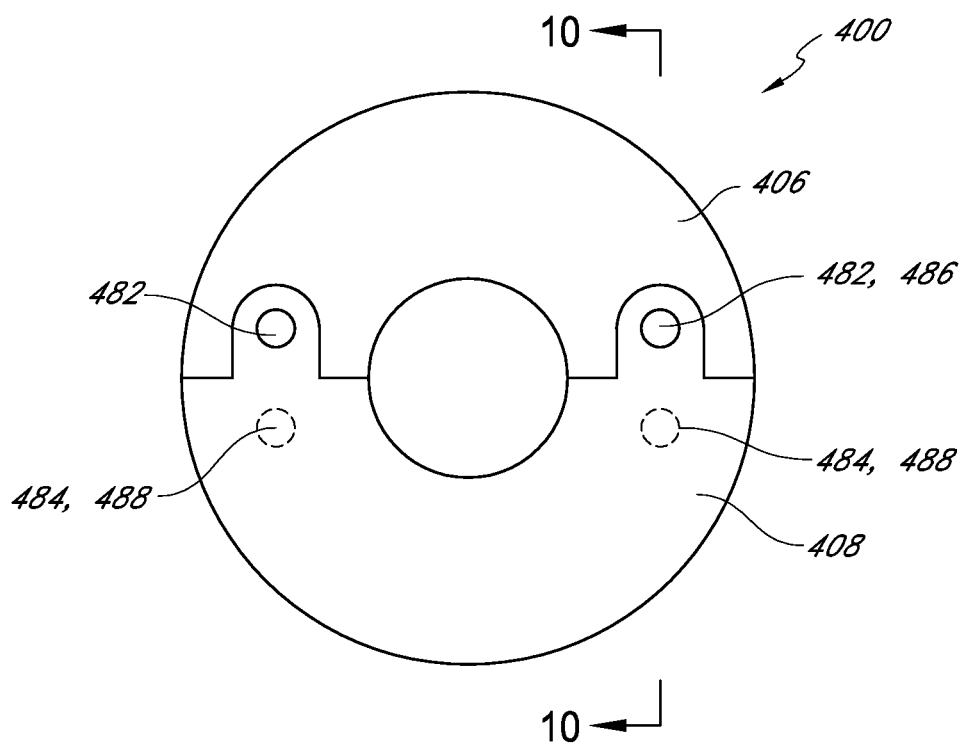
FIG. 9 illustrates a top view of interconnecting endplates of the cable protection system of FIG. 5.
Figure 10:
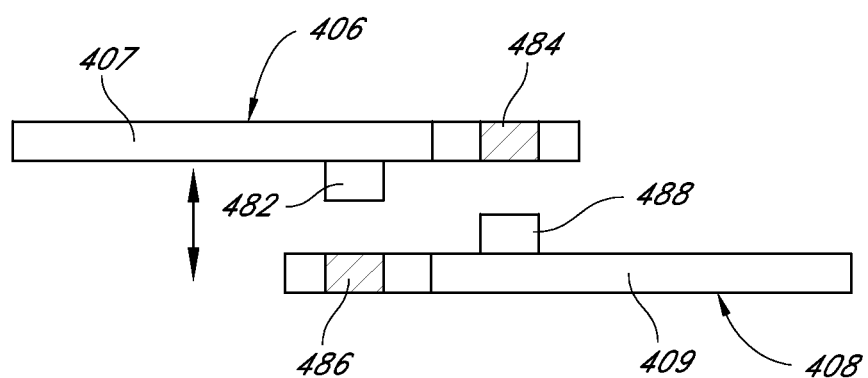
FIG. 10 illustrates a cross-sectional view of the endplates shown in FIG. 9.

According to some embodiments, the separate halves 406, 408 (e.g., hemispherical portions) or other separate components or portions that comprise the protection system 400 can be secured to one another using a pin and hole engagement system as illustrated in FIGS. 9 and 10. As shown, an endplate or other member 407 of the first hemispherical portion 406 comprises one or more pins 482 or other protruding members that are shaped, sized and otherwise configured to fit within corresponding openings or recesses 486 in an endplate or other member 409 of the second hemispherical portion 408. Likewise, the endplate or other member 409 of the second hemispherical portion 408 comprises one or more pins 488 or other protruding members that are shaped, sized and otherwise configured to fit within corresponding openings or recesses 484 in the endplate or other member 407 of the first hemispherical portion 406. Thus, when properly aligned with one another, the corresponding pins and openings of the endplates 407, 409 will mate with one another, thereby preventing or reducing the likelihood of relative rotational movement between the hemispherical portions 406, 408. To prevent or reduce the likelihood of axial or longitudinal movement between the hemispherical portions, one or more additional screws, tabs, pins, other fasteners and/or the like can be used. In other embodiments, a different attachment device, system and/or method can be used, either in addition to or in lieu of the aforementioned fastening systems and methods, to secure the various components of the protection system 400 to one another, such as, for example, rivets, clasps, wires, welds, adhesives, bonding agents, interlocking or overlapping connections, hinges, press-fit or snap fit connections, outer bands, combinations thereof and/or the like.

Figures 11A, 11B:
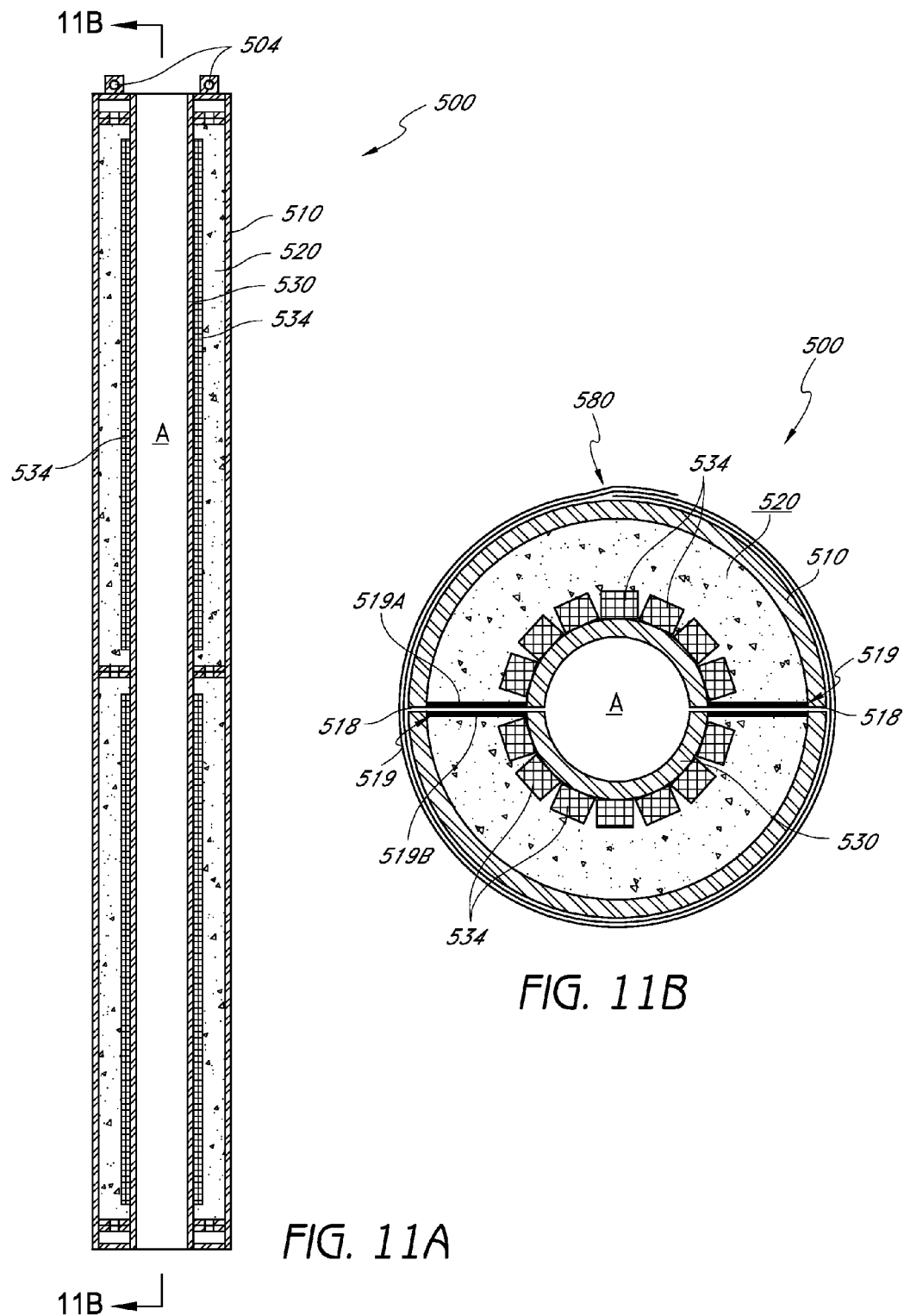
FIG. 11A illustrates a vertical cross-sectional view of a cable protection system according to one embodiment.
FIG. 11B illustrates a horizontal cross-sectional view of the cable protection system of FIG. 11A.

FIGS. 11A and 11B illustrate another embodiment of a protection system configured to surround and shield cables, cables bundles and/or any other structural or non-structural component from a potentially damaging event or occurrence (e.g., blast, sawing or cutting event, fire or other heat-generating event, ramming or other impact, other terrorist event and/or the like). As shown in the horizontal cross-sectional view of FIG. 11B, and in accordance with at least some other embodiments disclosed herein, the cable protection system 500 can comprise an outer shell or encompassing member 510 and an inner shell or encompassing member 530. As discussed, such encompassing members 510, 530 can comprise one or more rigid, semi-rigid and/or flexible materials, such as, for example, metal (e.g., steel), alloys, thermoplastics, elastomers, fiber-reinforced resins, other composites and/or the like, in accordance with a target design. Further, the annular space defined between the shells or encompassing member 510, 530 can be filled, at least partially, with one or more filler materials 520. As discussed herein, such fillers can include, but are not limited to, vermiculite, ceramic, resin, rubber or other elastomeric materials, other polymers, reinforcing fibers (e.g., carbon, glass, aramid, steel or other metal, other reinforcing fibers), epoxies, grouts, cement or other cementitious materials, steel, alloys or other metals, wood or paper-based materials, felts, any other material and/or combinations thereof. In some embodiments, such filler materials do not comprise cement, concrete, grout or other materials that are relatively heavy. For example, in one embodiment, the filler materials does not comprise components that have a density greater than about 1,000, 1,200, 1,400, 1600, 1,800, 2,000, 2,200, 2,400, 2,600, 2,800, 3,000 kg/m³ or densities in between the foregoing values, density greater than 3,000 kg/m³. Such a characteristic regarding filler materials for cable protection systems can apply to any other embodiments disclosed herein. As a result, the resulting protection systems can be relatively lightweight, thereby not altering or otherwise negatively affecting the design capacity of the cables and the associated structure being protected. According to some embodiments, the filler material comprises one or more fire protection or fire retardant materials, such as, for example, ceramic and/or vermiculite.

With continued reference to the cross-sectional view of FIG. 11B, a plurality of tiles 534 can be provided on, along or near the outer surface of the inner shell or encompassing member 530. As discussed in greater detail herein, such tiles 534 can be stacked end-to-end (e.g., horizontally, vertically and/or both horizontally and vertically). Alternatively, in some embodiments, a gap exists between two or more adjacent pairs of tiles 534 (e.g., in the vertical and/or the horizontal direction), as desired or required by a particular application, use or design. Regardless of their exact orientation, size, spacing and/or other details, the tiles 534 can be help in place by securing them to the outside of the inner shell or encompassing member 530 (e.g., using adhesive, grout, fasteners, etc.), by forcing them along or near the inner shell 530 by placement of the filler material within the annular space and/or using any other technique, method or device.

As noted with reference to other embodiments herein, the inclusion of tiles 534 in a cable protection system 500 can further enhance certain qualities of the protection system, including, for example, resistance to fires and heat resulting therefrom, sawing, other types of cutting or potentially comprising activities, abrasion and the like. In some arrangements, the tiles 534 comprise ceramic tile or any other type of standard or non-standard tile that offers favorable resistance to heat. The tile can include one or more other materials, such as, for example, porcelain, quarry, granite, rock, clay, composites, other natural or synthetic materials and/or the like, either in lieu of or in addition to ceramic. In some embodiments, the tile is standard, off-the-shelf tile, which may be provided as individual tile or in sheets (e.g., connected with a backing layer). The tile can include any shape and size. For instance, in one embodiment, the individual tile is approximately ¾-inch by ¾-inch. Alternatively, however, the tile can include a different shape (e.g., non-square, rectangular, triangular, other polygonal, circular, oval, irregular, etc.) and/or size, as desired or required. Tiles can be included in any of the protection system embodiments disclosed herein, regardless of whether such tile is illustrated in the corresponding figures of such embodiments.

In the embodiment illustrated in FIGS. 11A and 11B, the protection system comprises tiles only along or near the inner shell or encompassing member 530. However, in other arrangements, such as the system discussed herein with reference to FIG. 7, tiles can be positioned both the inner and outer shells 530, 510, as desired or required. In yet another embodiment, tile may be positioned along only the outer shell 510, within the annular space between the shells 510, 530 (e.g., within the filler material 520) and/or any other location.

With continued reference to FIGS. 11A and 11B, the protection system 500 can comprise two or more separate portions that are subsequently joined to surround, at least partially, a cable, bundle and/or any other structural or non-structural member it is intended to protect. For example, in the depicted arrangement, the protection system comprises two hemispherical portions that are of about equal size and general configuration. Such separate portions can be configured to mate and join with one another to selectively surround (e.g., completely or at least partially in the circumferential direction) a cable, bundle or other structural or non-structural member (not shown) to be located within the space A defined by the inner shell 530. Such a configuration can be incorporated into any of the embodiments of a protection system disclosed herein. Alternatively, the protection system can be formed as a single, unitary member that comprises a generally monolithic structure. In some embodiments, such a design is designed to prevent separation of the protection system from one or more of its components and/or separation of the protection system from the cable, bundle and/or other member it is intended to protect.

As illustrated in FIG. 11B, in arrangements of a protection system 500 that comprise two or more separate portions, one or more sealing members 519 can be provided at the interfaces 518 of the separate portions. In some embodiments, the sealing member 519 can comprise a rubber or elastomeric gasket or other compressible member. As shown in FIG. 11B, the seal 519 can comprise a compressible layer 519A, 519B or member along a face of each of the separate portions of the protection system 500. Thus, when the two (or more, in different embodiments) of the portions are moved in close proximity to one another, the gaskets or other sealing members 519 can compress to form a better connection between the adjacent portions of the system. Any other type of sealing or connection method or device can be used to enhance the interface between the adjacent portions of a protection system, either in lieu of or in addition to gaskets or other sealing members, as desired or required.

With continued reference to FIG. 11B, one or more additional layers and/or members 580 can be positioned along the outside of the protection system 500 (e.g., along the exterior surface of the outer encompassing member or shell 510). According to some embodiments, as is discussed in greater detail with reference to the arrangement of FIGS. 13, 14A and 14B herein, one or more layers of rubber, fiber-reinforced resin and/or the like are secured along the outside of the protection system 500. Such a configuration can help deflect or reduce the impact of certain blasts or other impact forces that may be directed in the direction of a protection system and the underlying cable or other member that the system is intended to protect. Such exterior impact deflecting or reducing layers or members can be incorporated into any of the protection system embodiments disclosed herein, or equivalents thereof.

Figures 12A, 12B:
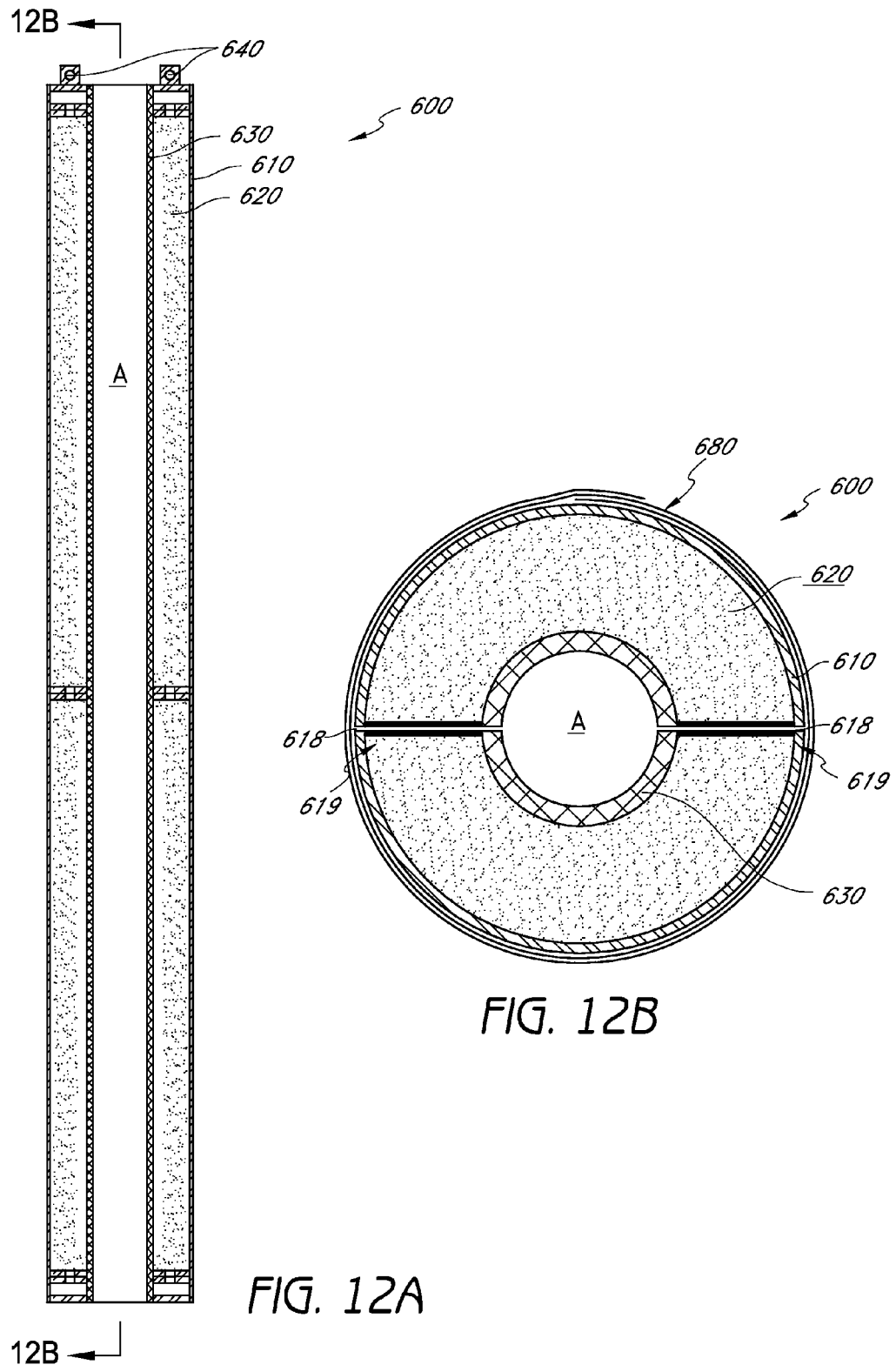
FIG. 12A illustrates a vertical cross-sectional view of a cable protection system according to another embodiment.
FIG. 12B illustrates a horizontal cross-sectional view of the cable protection system of FIG. 12A.

FIGS. 12A and 12B illustrate different views of another protection system 600 adapted to protect a cable, a bundle of cables and/or any other structural or non-structural member. As with other embodiments disclosed herein, the depicted protection system 600 comprises an inner shell or encompassing member 630 and an outer shell or encompassing member 610. In some embodiments, the annular space between the shells 610, 630 is filled, at least partially, with one or more filler materials (e.g., vermiculite, ceramic, other fire protection materials, etc.). As discussed herein with reference to other embodiments, the filler material can be gravity fed or other pressure fed (e.g., sprayed, delivered through a nozzle, etc.) into the annular space. The filler material may or may not comprise cement, concrete, grout and/or other relatively heavy materials, as desired or required. Regardless of the exact composition of the filler material 620, such filler material can be configured to set, at least partially, to form a uniform structure between the adjacent shells or encompassing members. Unlike the embodiment of FIGS. 11A and 11B, the depicted protection system does not comprise tiles along the inner and/or outer shells. However, ceramic tiles (e.g., fragments, chips, etc.) can be included within the filler material 620 to provide at least partial shielding and/or protection from abrasion, fire resistant, impact and/or other potentially damaging events, acts or occurrences.

Figure 13:
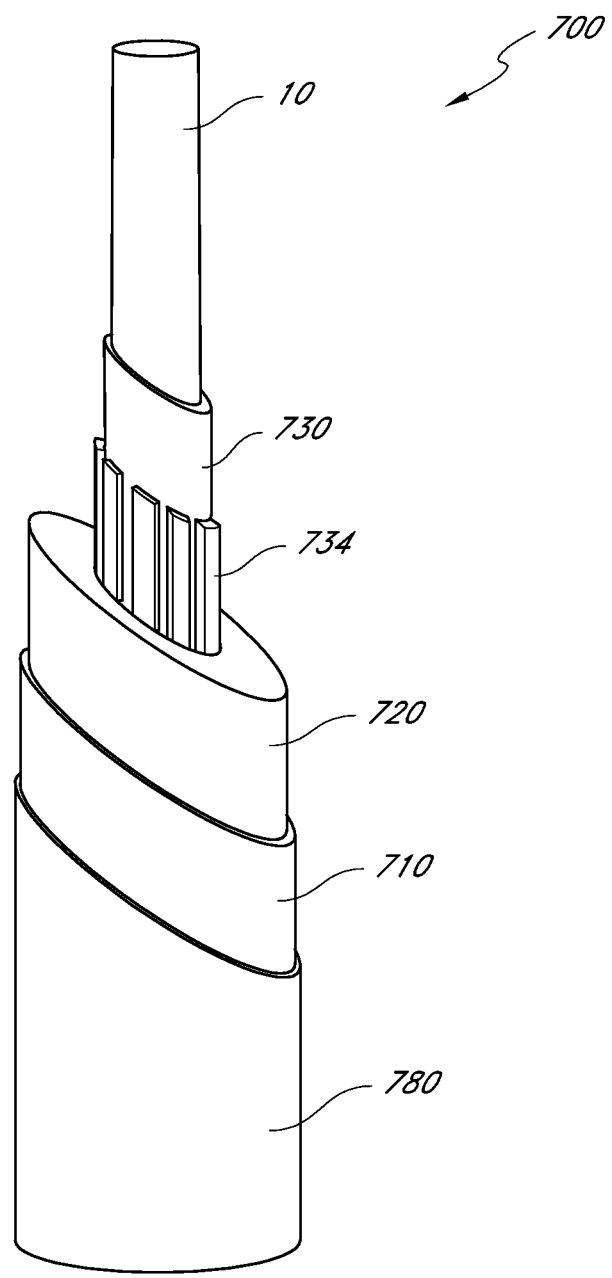
FIG. 13 illustrates a partially-exposed perspective view of a cable protection system according to one embodiment.

Another embodiment of a cable protection system 700 is illustrated in FIG. 13. As shown, system 700 can be sized, shaped and otherwise adapted to be positioned around a cable, bundle of cables and/or any other structural or non-structural (e.g., pipe, conduit, etc.) component or member in need of protection. As with other configurations disclosed herein, the protection system of FIG. 13 comprises an inner shell or encompassing member 730 and an outer shell of encompassing member 710. The inner and outer shells or encompassing members 730, 710 can be concentric or non-concentric, as desired or required. Further, although the shells are illustrated as having a generally circular cross-sectional shape, they can be configured with any other shape, such as, for example, square, other rectangular, elliptical, oval, pentagonal, hexagonal, octagonal, decagonal, other polygonal, irregular and/or the like.

With continued reference to FIG. 13, the protection system 700 can comprise one or more filler materials 720 generally positioned between the inner and outer encompassing members or shells 730, 710. As discussed herein, such fillers can include, but are not limited to, vermiculite, ceramic, resin, rubber or other elastomeric materials, other polymers, reinforcing fibers (e.g., carbon, glass, aramid, steel or other metal, other reinforcing fibers), epoxies, grouts, cement or other cementitious materials, steel, alloys or other metals, wood or paper-based materials, felts, any other material and/or combinations thereof. In some embodiments, such filler materials do not comprise cement, concrete, grout or other materials that are relatively heavy. For example, in one embodiment, the filler materials does not comprise components that have a density greater than about 1,000, 1,200, 1,400, 1600, 1,800, 2,000, 2,200, 2,400, 2,600, 2,800, 3,000 kg/m$^3$ or densities in between the foregoing values, density greater than 3,000 kg/m$^3$. Such a characteristic regarding filler materials for cable protection systems can apply to any other embodiments disclosed herein. As a result, the resulting protection systems can be relatively lightweight, thereby not altering or otherwise negatively affecting the design capacity of the cables and the associated structure being protected. According to some embodiments, the filler material comprises one or more fire protection or fire retardant materials, such as, for example, ceramic and/or vermiculite.

Figure 14A:
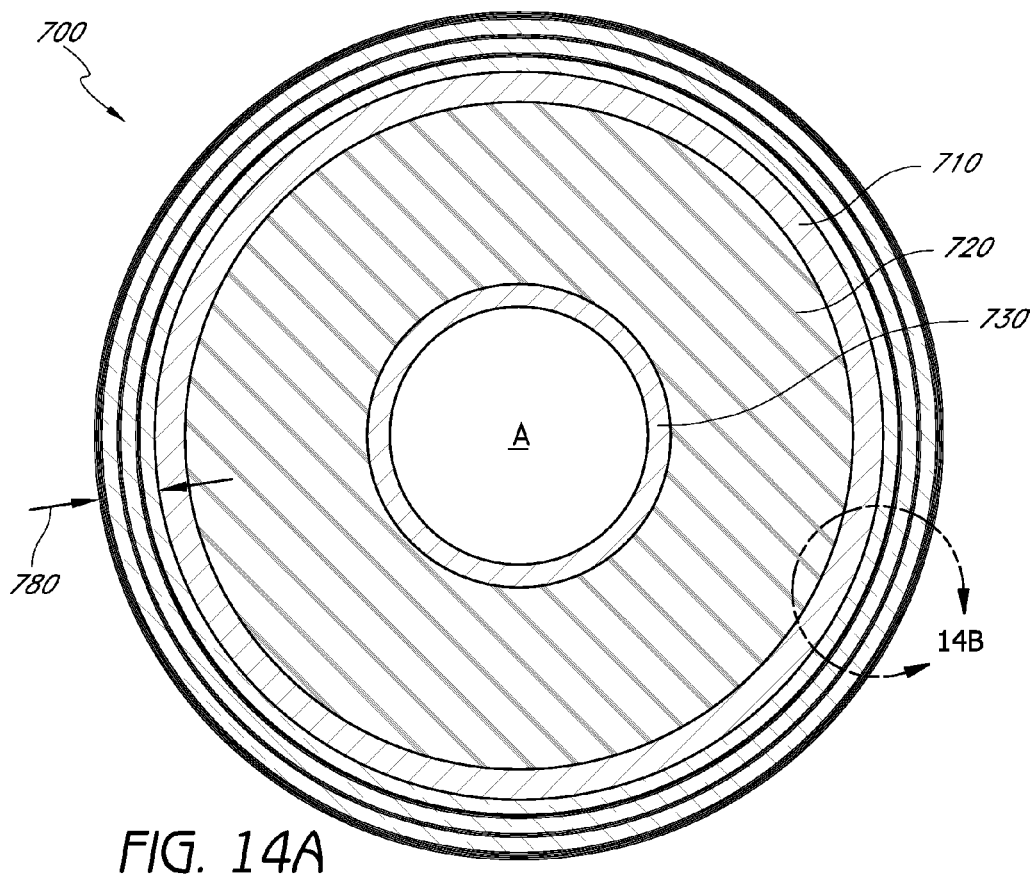
FIG. 14A illustrates a horizontal cross-sectional view of the cable protection system of FIG. 13.
Figure 14B:
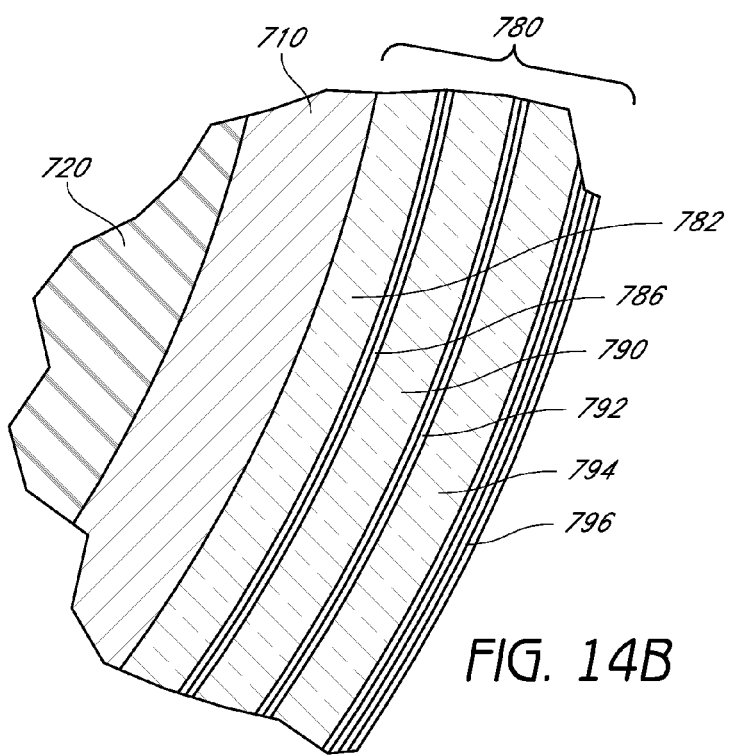
FIG. 14B illustrates a detailed horizontal cross-sectional view of the cable protection system of FIG. 14A.

As illustrated in the perspective view of FIG. 13 and the corresponding horizontal cross-sectional views of FIGS. 14A and 14B, a plurality of tiles 734 can be positioned on, along or near the outer surface of the inner shell 730 of the protection system 700. As discussed in greater detail herein, such tiles 734 can be stacked end-to-end (e.g., horizontally, vertically and/or both horizontally and vertically). Alternatively, in some embodiments, a gap exists between two or more adjacent pairs of tiles 734 (e.g., in the vertical and/or the horizontal direction), as desired or required by a particular application, use or design. Regardless of their exact orientation, size, spacing and/or other details, the tiles 734 can be help in place by securing them to the outside of the inner shell or encompassing member 730 (e.g., using adhesive, grout, fasteners, etc.), by forcing them along or near the inner shell 730 by placement of the filler material within the annular space and/or using any other technique, method or device.

As noted with reference to other embodiments herein, the inclusion of tiles 734 in a cable protection system 700 can further enhance certain qualities of the protection system, including, for example, resistance to fires and heat resulting therefrom, sawing, other types of cutting or potentially comprising activities, abrasion and the like. In some arrangements, the tiles 734 comprise ceramic tile or any other type of standard or non-standard tile that offers favorable resistance to heat. The tile can include one or more other materials, such as, for example, porcelain, quarry, granite, rock, clay, composites, other natural or synthetic materials and/or the like, either in lieu of or in addition to ceramic. In some embodiments, the tile is standard, off-the-shelf tile, which may be provided as individual tile or in sheets (e.g., connected with a backing layer). The tile can include any shape and size. For instance, in one embodiment, the individual tile is approximately ¾-inch by ¾-inch. Alternatively, however, the tile can include a different shape (e.g., non-square, rectangular, triangular, other polygonal, circular, oval, irregular, etc.) and/or size, as desired or required. Tiles can be included in any of the protection system embodiments disclosed herein, regardless of whether such tile is illustrated in the corresponding figures of such embodiments.

With continued reference to FIGS. 13, 14A and 14B, a cable protection system 700 can comprise one or more exterior layers or portions 780 that further enhance the protective qualities of such a system. For example, as illustrated in the cross-sectional views of FIGS. 14A and 14B, such an exterior portion 780 can comprise one or more layers of rubber 782, 790, 794, other elastomers or polymers and/or other materials. In some embodiments, the rubber layers comprise neoprene. However, in other arrangements, other types of rubber can be used, such as, for instance, natural rubber, Buna-N, SBR, butyl and/or the like, either in addition to or in lieu of neoprene. The quantity, thickness and/or other properties of the rubber layers 782, 790, 794 can vary, as desired or required. For example, fewer (e.g., 1 or 2) or more (e.g., 4, 5, 6, more than 6, etc.) layers of rubber, other elastomers and/or other materials can be provided along the exterior of the protection system 700. In some embodiments, the thickness of each rubber layer 782, 790, 794 is approximately 1/16 to 1/2 inch (e.g., about 1/16, 1/8, 3/16, 1/4, 5/16, 3/8, 7/16, 1/2 inch, values between the foregoing thicknesses, etc.). However, in other embodiments, the thickness of one or more rubber layers 782, 790, 794 can be greater than about 1/2 inch (e.g., approximately 1/2, 3/4, 1, 1 1/2, 2 inches, greater than 2 inches, etc.) or less than about 1/16 inch, as desired or required.

With continued reference to FIGS. 14A and 14B, the exterior portion 780 of the protection system comprises one or more fiber-reinforced layers 786, 792, 796 between adjacent rubber and/or other layers 782, 790, 794. Such fiber reinforced layers can be used to securely maintain the rubber and/or other layers 782, 790, 794 in place, to provide additional support and/or protective properties to the exterior portion 780 of the protective system 700 and/or to provide any other benefits or advantages.

For example, according to one embodiment, the first or innermost layer of rubber 782 is covered by one, two or more layers 786 of aramid, glass or other fiber reinforced resin Likewise, in some embodiments, a second layer of rubber 790 is positioned along the layer(s) of fiber reinforced resin 786 and covered by one, two or more additional layers 792 of aramid, glass or other fiber reinforced resin. With continued reference to FIGS. 14A and 14B, a third layer of rubber 794 can be placed along the second layer(s) of fiber reinforced resin 792 and covered by one, two or more additional layers 796 of glass or other fiber reinforced resin. In some embodiments, the fiber-reinforced resin layers comprise fiber laden fabric, splayed bundles and/or the like. Further, some embodiments do not include aramid or other UV-sensitive fiber along the outside of the exterior portion 780 so as to not compromise the integrity of the protection system 700 in the presence of sunlight and/or other UV radiation. According to some embodiments, the layers of fiber-reinforced resin layers are approximately 0.015 inches thick. However, the thickness, quantity, type and/or other properties of such layers can vary, as desired or required.

Regardless of its exact material and/or layer composition, thickness and/or other properties, the exterior portion 780 can be advantageously configured to help deflect or otherwise dissipate forces directed toward the protection system 700. For example, the rubber and/or other components included in the exterior portion 780 can shear, bend or otherwise deform when subjected to forces generated by a blast (e.g., C4, other explosives, etc.) and/or other types of force-generating events or occurrences. As a result, the forces that actually make to the underlying layers of the protective system 700 (e.g., the shells 710, 730, the filler materials 720, etc.) can be advantageously dissipated and/or otherwise reduced. This can help preserve the integrity of the protective system and/or the cables being protected by the system 700.

Such an exterior portion 780 comprising one or more layers of rubber (e.g., neoprene, natural rubber, etc.), other elastomeric and/or polymeric materials, fiber reinforced resin layers and/or the like can be incorporated into any of the embodiments disclosed herein or equivalents thereof. For example, such a force-reducing or force-dissipating exterior portion can be used with a protection system having one, two or more encompassing members or shells. In addition, such an exterior portion in protection systems, regardless if such systems include or do not include tiles, resilient members (e.g. springs, dampening members, etc.) and/or other components or features.

In any of the embodiments disclosed herein, or equivalents thereof, a cable protection system can comprise one or more shape memory materials or members. Such shape memory materials can help provide a desired level of flexibility, bendability and/or other movement to a cable, cable bundle, column of other structural member during an impact, blast or other potentially damaging event or occurrence. The use of shape memory components and/or materials can help ensure that integrity of the cable or other protected member is maintained since such components or materials are configured to return to an equilibrium position after the potentially damaging forces, moments and/or other threatening consequences of a particular event or occurrence have been dissipated.

The systems, apparatuses, devices and/or other articles disclosed herein may be formed through any suitable means. The various methods and techniques described above provide a number of ways to carry out the inventions. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Although the inventions have been disclosed in the context of certain embodiments and examples, it will be understood by those skilled in the art that the inventions extend beyond the specifically disclosed embodiments to other alternative embodiments and/or uses and obvious modifications and equivalents thereof. Accordingly, it is not intended that the inventions be limited, except as by the appended claims.

What is claimed is:

1. A method of protecting a structural cable or cable bundle, the method comprising:
   positioning a first encompassing member around the cable or cable bundle, wherein a first space is defined between said first encompassing member and said cable or cable bundle; and
   positioning a first fill material within the first space to at least partially fill the first space;
   wherein the first fill material comprises vermiculite and ceramic.

2. The method of claim 1, wherein the fill material does not comprise concrete or cement.

3. The method of claim 1, wherein the fill material additionally comprises at one material selected from the following: a resin, a rubber, a polymeric material, reinforcing fibers, an epoxy, a grout, a cement, a granite, a wood or paper-based material and a felt.

4. The method of claim 1, further comprising placing at least one ceramic tile within the first space.

5. The method of claim 1, further comprising securing a plurality of tiles on, along or near the first encompassing member.

6. The method of claim 1, wherein the plurality of tiles comprise ceramic tiles.

7. The method of claim 1, wherein the first space comprises at least one compressible or dampening member or material.

8. The method of claim 7, wherein the at least one compressible or dampening member or material comprises at least one of a spring, polyurethane and another resilient member.

9. The method of claim 1, further comprising positioning a second encompassing member around the cable or cable bundle, said second encompassing member being positioned within the first space and generally between the first encompassing member and the cable or cable bundle, wherein a second space is defined between the second encompassing member and the first encompassing member, and wherein a third space is defined between the second encompassing member and said cable or cable bundle.

10. The method of claim 9, wherein the third space comprises an air gap, said air gap permitting the first and second encompassing members and the fill material to be slidably moved relative to the cable or cable bundle.

11. The method of claim 9, wherein the second space comprises at least one of a fill material, a tile and a compressible or dampening member.

12. The method of claim 9, wherein a plurality of tiles are positioned along a surface of at least one of the first encompassing member and the second encompassing member.

13. The method of claim 1, further comprising placing at least one exterior portion along an outside surface of the first encompassing member.

14. The method of claim 13, wherein the at least one exterior portion comprises at least one of a rubber and at least one layer of a fiber reinforced resin.

15. A protection system for at least partially shielding a cable, the system comprising:
 a first shell configured for placement around a cable or cable bundle, wherein a first void is defined between said first shell and an outside of the cable or cable bundle;
 a second shell positioned around the first shell, wherein a second void is defined between the first shell and the second shell; and
 at least one fill material positioned within the second void;
 wherein the at least one fill material comprises vermiculite; and
 wherein the first void permits the cable protection system to be slidably moved relative to the cable or cable bundle.

16. The system of claim 15, wherein the at least one fill material further comprises one or more of the following materials: resin, rubber, reinforcing fibers, epoxies, grouts, cement, steel, alloys or other metals, granite, wood or paper-based materials and felt.

17. The system of claim 15, wherein the second void comprises at least one tile.

18. The system of claim 15, wherein the at least one tile comprises ceramic tile.

19. The system of claim 18, wherein the at least one tile is positioned along at least one of an exterior wall of the first shell and an interior wall of the second shell.

20. The system of claim 15, wherein the second void comprises at least one compressible or dampening material or device.

21. The system of claim 15, further comprising at least one exterior portion along an outer portion of the second shell.

22. The system of claim 21, wherein the at least one exterior portion comprises at least one layer of fiber reinforced polymer.

23. The system of claim 21, wherein the at least one exterior portion comprises at least one layer of rubber configured to at least partially deflect a force directed at the system.

24. The system of claim 15, wherein at least one of the second shell and the first shell comprises at least one of a metal and a polymer.

* * * * *